(12) United States Patent
Dove et al.

(10) Patent No.: US 7,551,650 B2
(45) Date of Patent: Jun. 23, 2009

(54) BACKPLANE BUS

(75) Inventors: Jason Dove, Novato, CA (US); Brian Semple, Novato, CA (US); Andre Tanguay, Santa Rosa, CA (US)

(73) Assignee: Calix Networks, Inc., Petaluma, CA (US)

( * ) Notice: Subject to any disclaimer, the term of this patent is extended or adjusted under 35 U.S.C. 154(b) by 395 days.

(21) Appl. No.: 11/404,236

(22) Filed: Apr. 14, 2006

(65) Prior Publication Data

US 2006/0182144 A1   Aug. 17, 2006

Related U.S. Application Data

(62) Division of application No. 09/874,402, filed on Jun. 4, 2001, now Pat. No. 7,035,294.

(51) Int. Cl.
*H04J 3/04* (2006.01)
(52) U.S. Cl. .................................... 370/535
(58) Field of Classification Search ............... 370/398, 370/431, 470, 395, 390, 352, 471, 535, 363, 370/381, 252, 359, 384, 476, 353; 345/538, 345/560, 539, 548; 379/93.19, 100.02, 906; 341/106, 65, 67; 375/283; 455/422.1; 708/200, 708/670, 275; 711/217
See application file for complete search history.

(56) References Cited

U.S. PATENT DOCUMENTS

| | | | |
|---|---|---|---|
| 3,652,798 A | | 3/1972 | McNeilly et al. |
| 4,623,996 A | | 11/1986 | McMillen |
| 4,674,082 A | | 6/1987 | Flanagin et al. |
| 4,835,763 A | | 5/1989 | Lau |
| 4,868,557 A | * | 9/1989 | Perlman ............... 345/538 |
| 4,899,383 A | | 2/1990 | Einolf et al. |
| 4,970,723 A | * | 11/1990 | Lin ............... 370/359 |
| 5,003,531 A | | 3/1991 | Farinholt et al. |
| 5,088,089 A | * | 2/1992 | Gingell et al. ........... 370/363 |
| 5,150,356 A | | 9/1992 | Tsutsui |
| 5,249,220 A | * | 9/1993 | Moskowitz et al. ...... 379/93.19 |
| 5,307,353 A | | 4/1994 | Yamashita et al. |
| 5,327,420 A | | 7/1994 | Lyles |
| 5,365,521 A | | 11/1994 | Ohnishi et al. |
| 5,392,280 A | | 2/1995 | Zheng |
| 5,396,494 A | | 3/1995 | Roposh |
| 5,434,866 A | * | 7/1995 | Emerson et al. ......... 370/476 |
| 5,455,827 A | | 10/1995 | Krause et al. |

(Continued)

OTHER PUBLICATIONS

U.S. Appl. No. 09/874,402, filed Jun. 4, 2001 by Jason Dove et al.

(Continued)

*Primary Examiner*—Hong Cho
*Assistant Examiner*—Prenell P Jones
(74) *Attorney, Agent, or Firm*—Silicon Valley Patent Group LLP; Omkar Suryadevara

(57) ABSTRACT

A method of creating a signal encoded with a message for transmission from a line unit to a switch unit in a network element of a communication network includes arranging in the message a plurality of contiguous bytes of traffic and arranging in the message a plurality of contiguous nibbles of signaling wherein there is one nibble of signaling for each byte of traffic.

23 Claims, 24 Drawing Sheets

U.S. PATENT DOCUMENTS

| | | | |
|---|---|---|---|
| 5,570,344 | A | 10/1996 | Fujii |
| 5,572,513 | A | 11/1996 | Yamamoto et al. |
| 5,621,773 | A | 4/1997 | Varma et al. |
| 5,625,629 | A | 4/1997 | Wenk |
| 5,751,696 | A | 5/1998 | Bechtel et al. |
| 5,757,774 | A | 5/1998 | Oka |
| 5,781,320 | A | 7/1998 | Byers |
| 5,809,021 | A | 9/1998 | Diaz et al. |
| 5,832,197 | A | 11/1998 | Houji |
| 5,838,924 | A | 11/1998 | Anderson et al. |
| 5,867,484 | A | 2/1999 | Shaunfield |
| 5,889,773 | A | 3/1999 | Stevenson, III |
| 5,894,477 | A | 4/1999 | Brueckheimer et al. |
| 5,923,449 | A | 7/1999 | Doerr et al. |
| 5,987,026 | A | 11/1999 | Holland |
| 6,014,431 | A | 1/2000 | McHale et al. |
| 6,094,575 | A * | 7/2000 | Anderson et al. ........ 455/422.1 |
| 6,128,300 | A | 10/2000 | Horton |
| 6,167,041 | A | 12/2000 | Afanador |
| 6,169,749 | B1 | 1/2001 | Dove et al. |
| 6,181,694 | B1 | 1/2001 | Pickett |
| 6,192,399 | B1 | 2/2001 | Goodman |
| 6,195,355 | B1 | 2/2001 | Demizu |
| 6,205,155 | B1 | 3/2001 | Parrella et al. |
| 6,219,354 | B1 | 4/2001 | Fink et al. |
| 6,240,084 | B1 | 5/2001 | Oran et al. |
| 6,310,891 | B1 | 10/2001 | Dove et al. |
| 6,314,102 | B1 | 11/2001 | Czerwiec et al. |
| 6,359,859 | B1 | 3/2002 | Brolin et al. |
| 6,359,889 | B1 | 3/2002 | Tazaki et al. |
| 6,362,908 | B1 | 3/2002 | Kimbrough et al. |
| 6,408,033 | B1 | 6/2002 | Chow et al. |
| 6,501,758 | B1 | 12/2002 | Chen et al. |
| 6,545,781 | B1 | 4/2003 | Chang et al. |
| 6,563,818 | B1 | 5/2003 | Sang et al. |
| 6,628,651 | B1 | 9/2003 | Ryan et al. |
| 6,633,566 | B1 | 10/2003 | Pierson, Jr. |
| 6,643,254 | B1 | 11/2003 | Kajitani et al. |
| 6,657,952 | B1 | 12/2003 | Shiragaki et al. |
| 6,665,263 | B1 | 12/2003 | Kawabata et al. |
| 6,721,273 | B1 | 4/2004 | Lyon |
| 6,721,502 | B1 | 4/2004 | Al-Salameh et al. |
| 6,731,832 | B2 | 5/2004 | Alvarez et al. |
| 6,735,191 | B1 | 5/2004 | Hosein |
| 6,760,327 | B1 | 7/2004 | Manchester et al. |
| 6,771,663 | B1 | 8/2004 | Jha |
| 6,775,229 | B1 | 8/2004 | Mo et al. |
| 6,778,529 | B1 * | 8/2004 | Field et al. .................. 370/353 |
| 6,798,784 | B2 | 9/2004 | Dove et al. |
| 7,006,497 | B2 * | 2/2006 | Dove et al. .................. 370/390 |
| 7,319,673 | B1 * | 1/2008 | Briscoe et al. .............. 370/252 |

OTHER PUBLICATIONS

Office Action dated Mar. 18, 2005 in U.S. Appl. No. 09/874,402.
Amendment dated Jun. 20, 2005 in U.S. Appl. No. 09/874,402 by inventor Jason Dove et al.
Notice of Allowance dated Sep. 14, 2005 in U.S. Appl. No. 09/874,402.
Comments on Statement of Allowance dated Dec. 13, 2005 in U.S. Appl. No. 09/874,402.
Supplemental Notice of Allowance dated Mar. 16, 2006 in U.S. Appl. No. 09/874,402.
U.S. Appl. No. 09/874,904, filed Jun. 4, 2001 by Jason Dove et al.
Office Action dated Apr. 1, 2005 in U.S. Appl. No. 09/874,904.
Amendment dated Jun. 27, 2005 in U.S. Appl. No. 09/874,904 by inventor Jason Dove et al.
Notice of Allowance dated Sep. 21, 2005 in U.S. Appl. No. 09/874,904.

* cited by examiner

| BIT> | 31 30 | 29 28 27 26 25 24 23 22 21 20 | 19 18 17 16 15 14 13 12 11 10 | 9 8 7 6 5 4 | 3 2 1 | 0 |
|---|---|---|---|---|---|---|
| WORD 0 [31:0] | | VPI [11:0] | VCI [15:0] | | PTI [2:0] | CLP |
| WORD 1 [63:32] | PAYLOAD BYTE 1-4 OF 48 ||||||
| WORD 1 [31:0] | PAYLOAD BYTE 5-8 OF 48 ||||||

FIG. 8

| PRIORITY | TRANSPORT TYPE | CHANNEL TYPE | TRAFFIC TYPE |
|---|---|---|---|
| 1 | CHANNELIZED | ANY | GIGAPOINT OVERHEAD |
| 2 | CHANNELIZED | STS | STS CHANNELS |
| 3 | SYNC PACKET | SYNC | TDM PACKETS |
| 4 | SYNC PACKET | SYNC | MULTICAST PACKETS |
| 5 | ASYNC PACKET | ASYNC | UNICAST PACKETS |

FIG. 11

| BIT> | 3 3 1 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| WORD 0 [63:32] | PACKET TYPE [3:0] | | | | PACKET COS [3:0] | | | | PACKET LENGTH [5:0] | | | | | | CONTEXT EXTENSION [3:0] | | | | A L 0 P | B L 0 P | G B P | UP:PACKET ARRIVAL DOWN:PACKET GRANT [11:0] | | | | | | | | | | |
| WORD 0 [31:0] | FACILITY ID EXT. [1:0] | | FACILITY ID [3:0] | | | | PLANE ID [1:0] | | ROUTING MAP [23:0] | | | | | | | | | | | | | | | | | | | | | | |
| WORD 1 [63:32] | FLOW ID EXTENSION [19:16] | | | | | | | FLOW ID [15:0] | | | | | | | | | | | | | VPI [11:0] | | | | | | | | | | |
| WORD 1 [31:0] | VCI [15:0] | | | | | | | | | | | | | | | | PTI [2:0] | | | C L P | rfu [3:0] | | | | | HEC (OF 120 BITS): [7:0] | | | | | | |

FIG. 9

| ACTIVE STS CHANNELS | GIGAPOINT FLPS PER FRAME | PACKET DATA RATE (PAYLOAD ONLY) |
|---|---|---|
| 0 | 758 PACKETS | 2.33 Gbps |
| 3 | 720 PACKETS | 2.21 Gbps |
| 12 | 607 PACKETS | 1.86 Gbps |
| 24 | 455 PACKETS | 1.40 Gbps |
| 48 | 151 PACKETS | 0.46 Gbps |

*FIG. 18*

| OVERHEAD BYTE | POSITION IN OH CHANNEL | DESCRIPTION |
|---|---|---|
| GA1/GA2 | BYTES 1 AND 2 | GA1 AND GA2 BYTES CARRY GIGAPOINT FRAMING |
| GB1 | BYTE 91 | BIP - 8 PARITY. CALCULATED ON THE CONTENTS OF THE PREVIOUS FRAME |
| GK1 | BYTE 362 | GIGAPOINT RESET AND FRAME COUNT |
| GS1 | BYTE 721 | GIGAPOINT ACTIVE, PROTECT, STS PAGE, USER FIELD |

*FIG. 19*

| BIT | DESIGNATION | DESCRIPTION |
|---|---|---|
| GK1 BIT 3 | SYNC DATA 1 | MSB OF THE TWO-BIT SYNC DATA BUS. USED AS A LOW SPEED SYNCHRONOUS DATA LINK CHANNEL BETWEEN THE RAP CARD ABD LINE UNITS. AT LINE UNIT INSERTION, THE SYNC DATA LINK IS USED TO CONFIGURE THE LINE UNIT'S GIGAPOINT CHANNELS TO THE MATCH THE RAP CARD'S GIGAPOINT. WHEN THE GIGAPOINT CHANNELS ARE CONFIGURED, FURTHER RAP PROCESSOR TO LINE UNIT PROCESSOR COMMUNICATION ARE CARRIED ON OVER THE GIGAPOINT'S SYNC OR ASYNC PACKET CHANNELS. SYNC DATA BITS 1 AND 0 ARE QUALIFIED BY A CHANGE IN STATE OF THE SYNC CLOCK. SYNC DATA IS TRANSFERRED ON RISING ABD FALLING EDGES OF THE SYNC CLOCK. |
| GK1 BIT 2 | SYNC DATA 0 | LSB OF THE TWO-BIT SYNC DATA BUS |
| GK1 BIT 1 | SYNC CLOCK | SYNC CLOCK. RISING AND FALLING EDGE OF THIS CLOCK QUALIFIES SYNC DATA BITS 1 AND 0. |
| GK1 BIT 0 | HANDSHAKE BIT | THIS BIT TRANSFERS THE LOF (LOSS OF FRAME SYNC) STATE FROM THIS GIGAPOINT INTERFACE TO THE REMOTE GIGAPOINT INTERFACE.<br><br>WHEN THIS BIT IS LOW, THE LOCAL RECEIVER IS OUT OF FRAME SYNC AND THE REMOTE TRANSMITTER SHOULD SEND THE IDLE DATA PATTERN WHEN NOT IN GA1 OR GA2 FRAME PATTERN TIMESLOTS.<br><br>WHEN THIS BIT IS HIGH, FRAME SYNC HAS BEEN ACQUIRED. THE REMOTE TRANSMITTER CAN ENABLE ITS ACTIVE PAYLOAD BIT AND DRIVE THE GIGAPOINT BUS WITH ACTIVE TRAFFIC |

*FIG. 21*

BACKPLANE BUS

CROSS-REFERENCE TO PRIOR APPLICATION

This application is a divisional application of and claims priority from U.S. patent application Ser. No. 09/874,402, filed Jun. 4, 2001, by Jason Dove et al. (i.e. U.S. Pat. No. 7,035,294).

Incorporated by reference herein in its entirety, is U.S. patent application Ser. No. 09/874,402, including an Appendix A therein.

BACKGROUND OF THE INVENTION

Backplane buses provide connections between cards in a chassis. For example, a document entitled "PHASE—Flexibility and Modularity from STM-1 to STM-16" available over the Internet at http://home.wtal.de/jga/phase.pdf states that the type and features of PHASE network elements are determined by the type and number of the hardware and software modules used. The following basic types of network element are possible: Terminal Multiplexer (TM), Add/Drop Multiplexer (ADM), Local Cross Connect (LXC), Line Regenerator (LR). These basic types can be configured for the STM-1, -4 and -16 levels of the SDH hierarchy and for the VC-12 and VC-4 connectivity levels. This document further states that "Data traffic between the plug-in units is handled via bus systems in the backplane of the shelf to achieve the maximum possible flexibility in configuring the plug-in units in a network element."

SUMMARY

A method and apparatus are directed to connecting a line card to a switching card. Specifically, traffic, such as voice and data traffic, is transmitted from a line unit to a switching unit.

The traffic is received in the line card in serial form. The line unit converts the serial traffic that is received to parallel. Received traffic other than STS is converted to packets. STS traffic received by the line unit is frame aligned. After packetization/alignment, the receive traffic is serialized and sent to the switching card.

The serial traffic is organized into packets of a fixed size (i.e., fixed length packets). The serial traffic is then transmitted from the line unit to a switching unit. If the traffic received in the line unit is voice traffic, the voice traffic is sampled and converted into packets.

The method and apparatus create a signal encoded with a message for transmission from the line unit to the switch unit in a network element of a communication network by arranging in the message a plurality of contiguous bytes of traffic and arranging in the message a plurality of contiguous nibbles of signaling wherein there is one nibble of signaling for each byte of traffic.

BRIEF DESCRIPTION OF THE DRAWINGS

FIG. 8 illustrates the ATM header at UTOPIA Interface.

FIG. 9 illustrates the GigaPoint header.

FIG. 11 illustrates the priority by which types of traffic are transported over the GigaPoint interface.

FIG. 18 illustrates packet capacity per GigaPoint frame.

FIG. 19 illustrates the position and description of overhead data.

FIG. 21 describes four user bits with the GK1 GigaPoint overhead byte.

Use of the same reference symbols in different figures indicates similar or identical items.

DETAILED DESCRIPTION

Figure 1A:
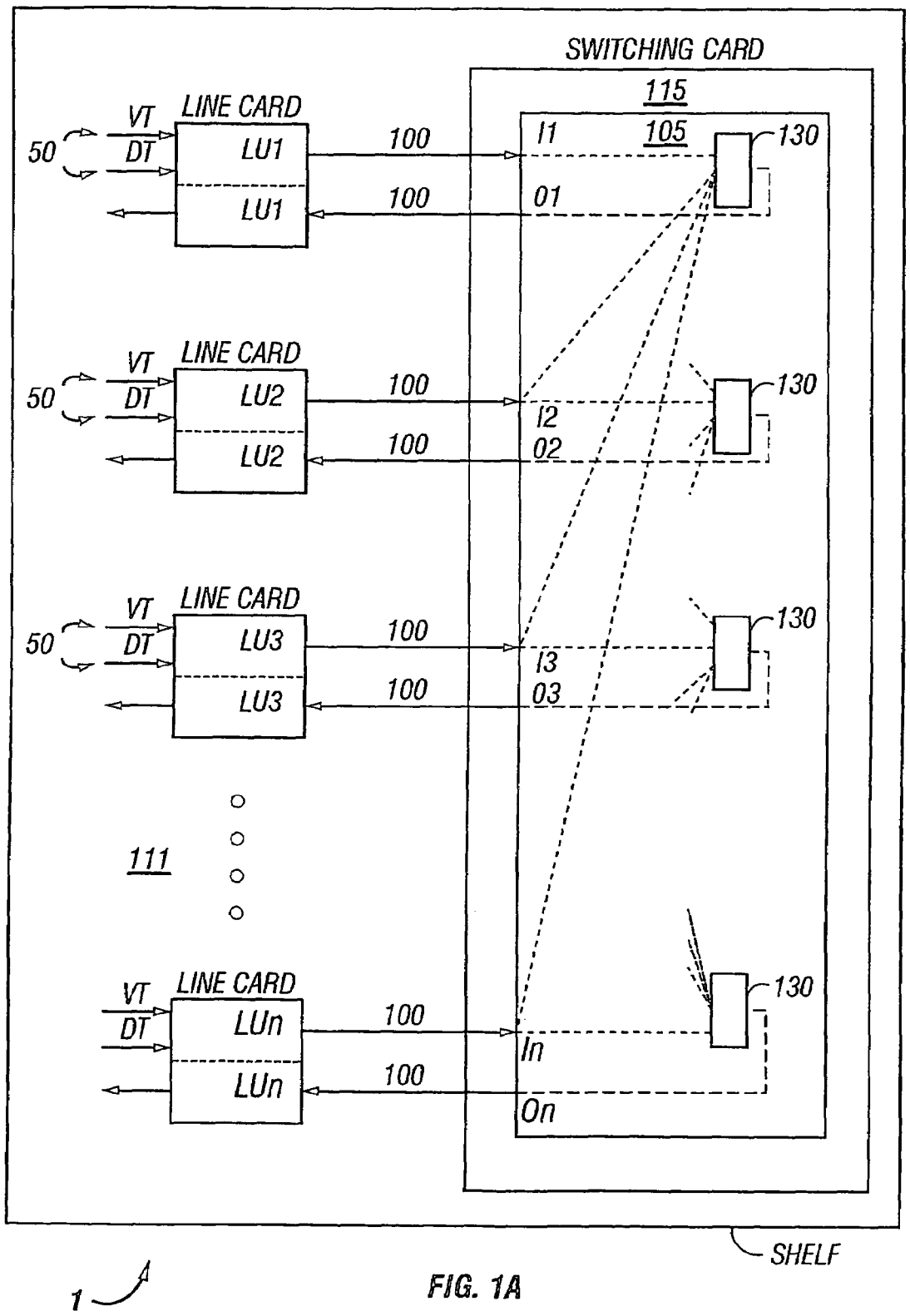
FIG. 1A illustrates a representative data transfer system in accordance with the invention.

Two closely interrelated segments of multi-service networking are "access" and "transport." "Access" refers to the technology by which users connect to a wide area network ("WAN"), and through it, to service providers or other users connected to the WAN at locations remote from the user. "Transport" refers to the technologies that make up the fabric of the WAN itself, including those relating to the transmission of the users' information across the WAN.

One model of a high-speed access-and-transport network system for which detailed standards have been developed by the International Telecommunication Union ("ITU") is the "Broadband Integrated Services Digital Network" ("BISDN") "umbrella" model, which, in one widely regarded embodiment, can be characterized as Asynchronous Transport Mode ("ATM") over a Synchronous Optical Network ("SONET") transmission system ("ATM/SONET").

Thus, one conventional paradigm of a BISDN access-and-transport system contemplates, 1) the "gathering" of lower-level voice, video, and data signals in a variety of formats from a large number of individual users at a "user network interface" ("UNI") located at the edge of a WAN, 2) the "grooming" of those signals, first by "ATM-izing," or "cellification" of the signals, if necessary, into fixed-length ATM cells, then by packaging, or "mapping," the ATM cells into SONET synchronous payload envelope ("SPE") structures, or "SONET Traffic Stream" ("STS") frames, of incremental capacities using high-speed switching techniques and an addressing system of "pointers" and transport and path overhead ("TOH" and "POH"), and 3) the "scattering" of the signals out over the WAN to their intended destinations.

However, some concerns exist regarding the "ATM/SONET" paradigm as it pertains to certain types of traffic, viz., voice and video signals, which are inherently isochronous or plesiochronous (i.e., time-division-multiplexed ("TDM") traffic), as well as Internet Protocol ("IP") traffic, which, unlike both ATM and TDM traffic, is by nature "connectionless." While it is possible to ATM-ize both types of traffic, the resultant loss of bandwidth can greatly offset the increase in effective bandwidth afforded by the "statistical multiplexing" capabilities of ATM.

In light of the foregoing concerns, the assignee hereof has developed a novel, multi-functional, "hybrid" access-and-transport system, called the "C7" system, that is capable of supporting a wide variety of user interfaces, in terms of bandwidth, density, interface and application. It is a "hybrid" system, in that it is capable of efficiently gathering, grooming, and transporting both classical time division multiplexed ("TDM") and packet-switched (i.e., ATM, Multiprotocol Label Switching ("MPLS"), IP, Packet Over SONET ("POS"), and Frame Relay) types of traffic streams in their respective formats and protocols, thereby maximizing available bandwidth through the use of statistical multiplexing, while preserving or even improving the QoS level achievable in such a disparate traffic mix. The C7 system can be deployed in any of several different topologies, including linear point-to-point, ring, star, mesh or any combination of the foregoing.

The word "GigaPoint" describes a point-to-point serial bus design using a transmission rate measured in gigabits per second (Gbps). Data is transported between a number of line units (LU1-LUn where $1 \leq n \leq n+1$) (each line unit handling upstream and downstream traffic) and a Routing Crossconnect (RC) 105 over a number of GigaPoint buses 100. Each GigaPoint bus 100 includes two differential pairs (transmit and receive), 12.352 MHz clock, 16.384 MHz clock, 19.44 MHz clock and timing reference frame and clock signals. The line units include POTS, DS1, POTS/DSL, and SONET line units. Each line unit includes an Access Processor (AP) 110 which is the interface between the line unit and each GigaPoint bus 100 associated with that line unit. GigaPoint bus 100 performs the following functions: Data transport at a fixed line rate of 3.1104 Gbps; support for a number of different traffic types (including STS frames, Synchronous packets (TDM, Multicast) and Asynchronous packets (Unicast)) over one medium; transport of framing synchronization signals (6 millisecond superframe); transport of software-accessible overhead state information; transport of overhead state words; transport of overhead parity and transport of additional packet-related control and routing information within the GigaPoint header.

Such packet-related control and routing information includes, but is not limited to, packet type indication. RC 105, sometimes referred to as the Routing and Arbitration Processor (RAP) switch fabric, is the switching core on RAP assembly 115. The function of RAP 115 is to direct traffic from incoming ports to any outgoing port based on information maintained in RAP 115 itself or embedded within the data traffic. The term "upstream" refers to the traffic from subscriber ports (i.e., ports on the upstream portion of each line unit that are connected to users) to RAP 115 while "downstream" refers to the traffic from RAP 115 to the subscriber ports (i.e., ports on the downstream portion of each line unit that are connected to users). Access Processors (AP) 110 are located within the line units (FIG. 1B).

A function of AP 110 is to adapt traffic, such as packets and STS, to a format that can be transported over GigaPoint bus 100 to RAP 115. An AP 110 may be installed in each line unit slot or within RAP 115 and connected to RC 105 at the Physical layer (PHY) interface (i.e. GigaPoint bus 100). PHY interfaces for C7 line units include: (1) POTS line unit where the CODEC converts analog voice to/from a serial data stream which interfaces directly to AP 110; (2) DSL line unit where the DSL PHY is the physical interface for DSL line units and DSL PHYs may support single or multiple interfaces in DSL line formats such as DMT (discrete multitone); (3) DS1 line unit where the DS1 Framer and Line Interface Unit (LIU) are the physical interface for T1/DS1 cards; and (4) SLU line unit where the SONET PHY device is the physical interface for SONET line units and different SONET PHY devices may support single or multiple interfaces such as OC-3 and OC-12.

Figure 1B:
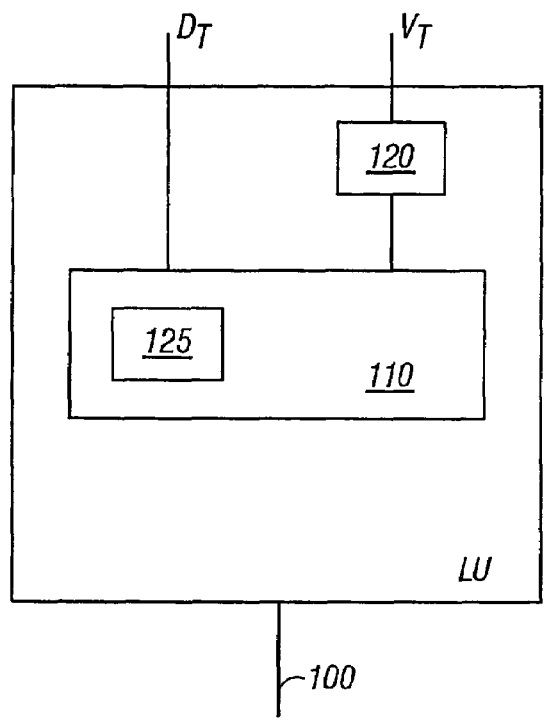
FIG. 1B illustrates a line unit for use in the system of FIG. 1A.

As seen in FIG. 1A, a number of line units (LU1-LUn) are connected to RC 105 which is located on RAP 115. There are two RAP 115 for redundancy (i.e., at any given time, one RAP is 'active' while the other RAP is 'redundant') and each RAP 15 is connected to the line units via data transfer buses 100. Voice traffic (VT) and data traffic (DT) are carried by lines 50 enter incoming ports (not shown) on the upstream portion of each line unit. Each line unit (LU1-LUn) has a number of outgoing ports (1-N where $1 \leq N \leq N+1$) exiting the line unit (LU1-LUn). RC 105 includes a number of input ports (I1-In where $1 \leq n \leq n+1$). There are an equal number of output ports (O1-On where $1 \leq n \leq n+1$) on RC 105 as input ports (I1-In).

As described in detail below, when voice traffic and data traffic is in the form of packets, each line unit (LU1-LUn) decodes information contained in incoming voice traffic VT and data traffic DT and compares that information to information stored within the line unit to determine the intended destination of the traffic. The line unit (LU1-LUn) then directs the traffic to an appropriate output port (1-N) based on the intended destination of the traffic. The line units (LU1-LUn) are pre-programmed with which output ports (1-N) the traffic is destined to. Each output port (1-N) represents a particular destination for the traffic. When voice traffic is in the form of digital samples (i.e., from a CODEC or DS1), the intended destination is pre-programmed by software in the line unit based on physical port number. The destination is a function of the physical port the data is coming from. In both cases, after generating fixed length packets containing the digital samples, the line unit appends a Routing Map to the data (i.e. the packet) which indicates the intended destination to RAP 115. Routing of the traffic occurs at RAP 115.

An example of traffic routing using the system of FIG. 1A is described hereafter. VT and DT enter the upstream path of a line unit, for example LU1. Line unit LU1 decodes information contained within the incoming VT and DT relating to the intended destination of the traffic. LU1 compares the intended destination to pre-programmed information within the line unit. The pre-programmed information correlates outgoing ports (1-N) on line unit LU1 to the intended destination which may result, for example, in a portion of the incoming traffic being directed to a destination-connected to output port O3 of RC 105 while another portion of the incoming traffic is directed to a destination connected to output port O1 of RC 105. Still more traffic may be directed to destinations connected to output ports O2 and On, respectively, of RC 105.

Figure 2A:
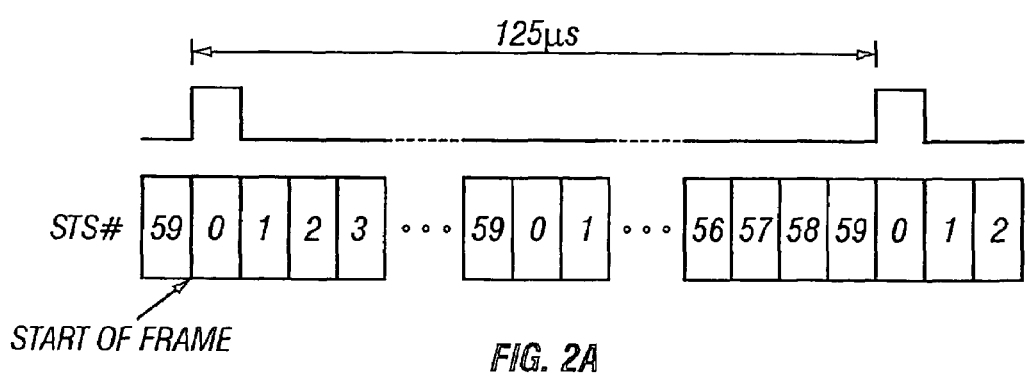
FIG. 2A illustrates a GigaPoint channel numbering with respect to frame sync.

Each GigaPoint output port is associated with an output multiplexer 130 which merely routes the traffic from an input port to its respective output port on RC 105. The line unit LU1 appends a Routing Map to the data and sends the data to I1 on RC 105. RC 105 directs the traffic to the appropriate outgoing port based on the Routing Map. Data transport bus 100 is based on a 125 microsecond Synchronous Optical Network (SONET) frame and a 6 millisecond custom superframe. FIG. 2A shows an example of channel arrangement on a 125 microsecond frame forming a portion of GigaPoint bus 100. The frame is based on GigaPoint channels. GigaPoint bus 100 can carry 60 GigaPoint channels, the equivalent of 60 SONET Traffic Stream-1 (STS-1) channels, or 3.1104 Gbps. The frame includes a pattern of 60 byte intervals or channels (0-59) that repeats 810 time every frame. Each byte within an interval represents one STS-1 worth of bandwidth (810 bytes/frame). If an interval is assigned to Synchronous or Asynchronous traffic, the interval carries fixed length packet (FLP) traffic. Interval 0 carries 5 bytes of overhead every frame. The 5-byte overhead is used for framing, superframe sync, active/protect state and other "low level" communications. When the channel is provisioned for TDM/Multicast or sync packet traffic, the TDM aligner within AP 110 takes into account the overhead bytes when scheduling traffic as the 5 bytes of overhead leave only 805 bytes in the channel to transport payload. A frame sync pattern ("GA1") appears at the start of a 125 microsecond GigaPoint frame.

In accordance with an embodiment of the invention, there are up to twenty line unit slots with one GigaPoint bus 100 per slot (i.e., twenty (20) GigaPoint buses 100 plus one to local PHY and another to the redundant RAP 115 for a total of twenty-two GigaPoint buses 100). Gigapoint bus 100 transports traffic between the line units and RAP 115. Traffic is transported over copper traces in RAP 115, backplane and line units. GigaPoint bus 100 is based on a 6 ms superframe that is not SONET compliant. SONET ESF is a 3 millisecond signaling superframe format. Five types of traffic are transported over GigaPoint bus 100: overhead, STS, synchronous (sync) TDM packets, sync packets, and asynchronous (async) packets. Sync TDM packets (strictly scheduled) have priority over other sync packet types.

Figure 2B:
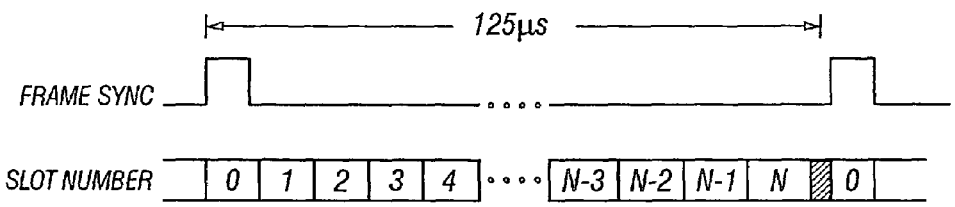
FIG. 2B illustrates a 125 microsecond frame.

FIG. 2B illustrates how fixed length packets are distributed across a data transfer frame, with a remainder at the end of the frame. There are N packet slots per 125 microsecond frame. A frame sync pulse delineates the start of a 125 microsecond frame. The 125-microsecond frame sync pulse, as described and illustrated herein, refers to frame sync signals that are present within RC 105 and AP 110. However, no 125-microsecond or 6-millisecond frame sync signal is present on GigaPoint bus 100. The GA1 and GA2 framing pattern within the 3.1104 Gbps data stream identify the start of a new 125-microsecond frame. The GK1 GigaPoint overhead byte identifies the 6-millisecond superframe by carrying the current frame number from 0 to 47.

For every STS-1 interval (a.k.a. "STS channel") assigned to synchronous traffic, 810 bytes (805 bytes for STS Interval 0) are made available to carry synchronous fixed length packets. 810 bytes divided by 64 bytes per packet yields 12.65625 packet slots per channel per frame. Fixed length packets must start on packet slot boundaries, and any fractional packet slot at the end of a frame is not used to carry synchronous packet traffic.

As stated above, the bandwidth of GigaPoint bus 100 is 3.1104 gigabits per second. This equates to one 40-bit word every 77.76 MHz clock cycle, which is the speed the GigaPoint MAC interface operates at. The GigaPoint MAC/SerDes converts the 3.1104 Gbps stream to/from discrete overhead signals, an 11-bit arrival/grant bus (to the arbiter of RC 105), a 40-bit sync packet/STS bus (to RC sync crossconnect), and a 64-bit async packet bus (to RC packet crosspoint). In AP 110, these parallel buses interface to the GigaPoint Adaptation module.

A circuit in the TDM aligner compensates for the number of channels allocated to TDM. The TDM aligner positions (strictly scheduled) sync TDM packets in specific positions within the 125 microsecond frame based on frame position field in VCI. The TDM aligner also inserts loosely scheduled sync packets in remaining sync packet slots. At the 3.1104 gigabits per second bandwidth for GigaPoint bus 100, a maximum limit for the number of packets that may be sent in any one frame is set at 758 packets for loosely scheduled packets and 512 packets for strictly scheduled sync TDM packets. This limit can be reached when all STS-1 intervals are assigned to synchronous traffic (i.e., if fewer intervals are assigned, fewer packets can be transported).

After the maximum number of packet slots have gone by on any single frame of Gigapoint bus 100, no more synchronous fixed length packets are sent until the next frame. This means that there is no benefit to configuring more than 41 of the 60 GigaPoint channels for TDM packets, because that yields 518 packets slots. As stated above, if there 12.65625 packet slots per channel per frame, then 512 packets divided by 12.65625 packet slots per GigaPoint channel per frame results in 40.45 channels which is rounded up to 41 channels. After the first 512 packets slots have gone by on GigaPoint bus 100, no more TDM FLPs are sent until the next 125 microsecond frame. However, Multicast and other sync packets may use all 60 channels. Software allocates the number of GigaPoint channels allocated to each type of traffic.

Figure 2C:
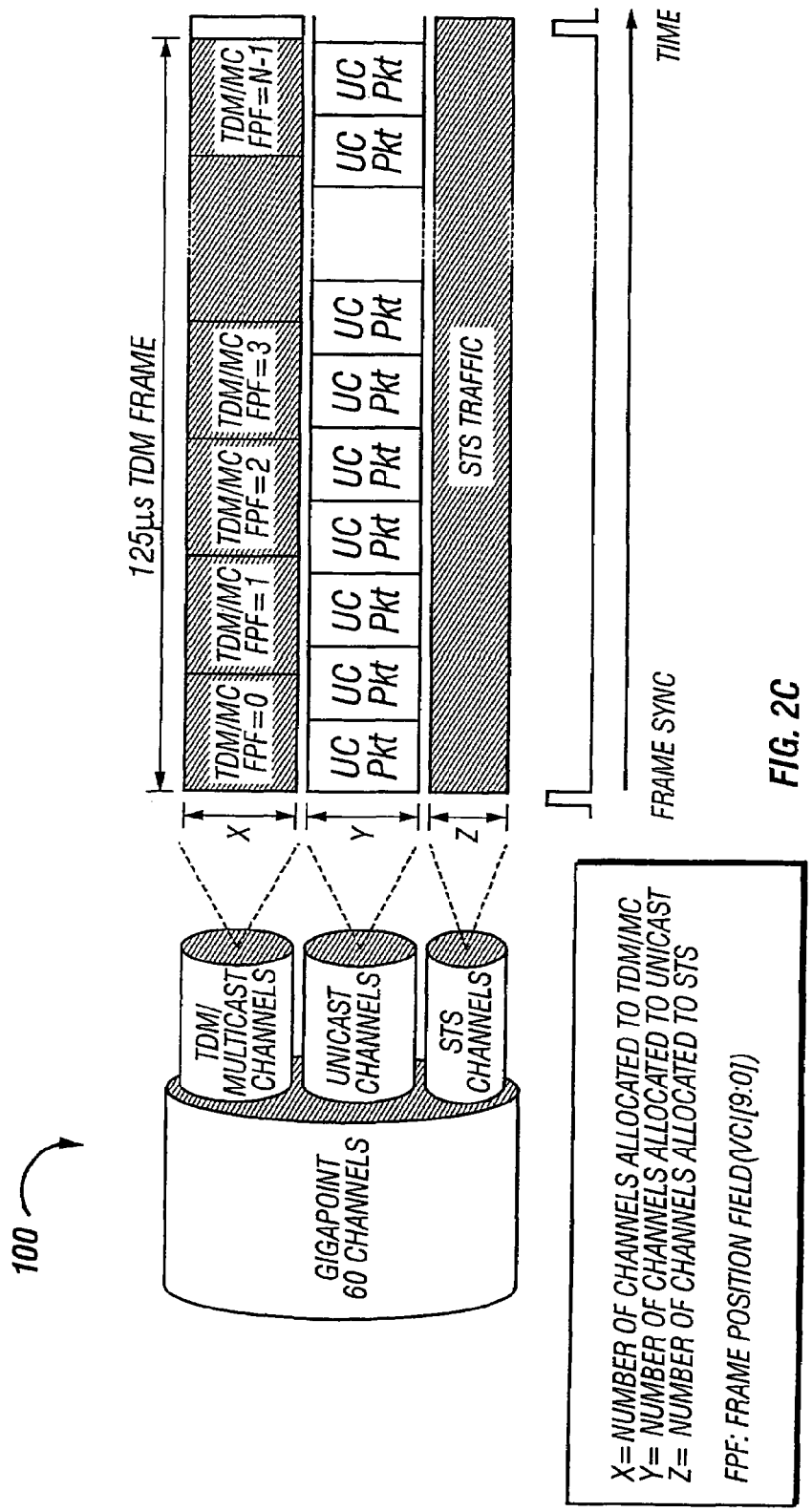
FIG. 2C illustrates an example of GigaPoint channel allocation.

FIG. 2C illustrates an example of GigaPoint channel allocation in which sync packets (TDM/Multicast), async packets (Unicast) and STS channels are transported simultaneously within one frame. A frame sync pulse marks the start of the 125 microsecond frame. The 60 channels of each 125 microsecond frame are divided among these three groups wherein:

$X+Y+Z=60$ where

X=number of channels allocated to TDM/Multicast

Y=number of channels allocated to Unicast

Z=number of channels allocated to STS

Each strictly scheduled TDM packet is associated with a Frame Position Field (FPF) which is placed in lowest 10 bits of the VCI field of the packet. The FPF is only needed for strictly scheduled TDM sync packets. The FPF refers to a specific packet slot position within a particular the frame. Each strictly scheduled TDM packet within a frame has a unique FPF number. GigaPoint bus 100 transports data in frames and a single GigaPoint 100 can carry the equivalent of 60 STS-1 channels, or 3.1104 Gbps. A GigaPoint frame is always 125 microseconds. GigaPoint channels may be allocated as follows: (1) async packets (e.g., Unicast); (2) sync packets (TDM strictly/loosely scheduled, Multicast, SAR, TOH); (3) STS channels (i.e., not packets but 810 bytes of data); and (4) unassigned. When a channel is unassigned, the GigaPoint sends an idle pattern '0x55'.

Each channel provides 810 bytes every 125 microsecond frame. For example, a TDM-packet, as outlined above and below, is 64-bytes long. The following formula calculates the portion of the frame that is occupied with sync packets (TDM or other); where N is the number of GigaPoint channels allocated to TDM traffic, 810 is the number of bytes per channel.

Frame Size=(N×810)/64 packet positions

Fractions of packets are ignored. For example, if 12 channels are allocated to TDM, the frame size is:

Frame Size=(12×810)/64=151.875

Frame Size=151 packet positions

From the perspective of GigaPoint bus 100, there are 151 packet positions for the TDM packets in a 125 microsecond frame. These positions are used as a reference at the RC 105 for cross-connecting and merging TDM packets. A representative method of merging TDM packets is fully disclosed in U.S. patent application Ser. No. 09/874,904, entitled TRAFFIC MERGING SYSTEM, which is herein incorporated by reference for all purposes. From a hardware perspective, there are no limitations as to which GigaPoint channels are allocated to TDM. However, as Channel 0 (i.e., the overhead channel) uses 5-bytes for overhead, if TDM is allocated in Channel 0, then only 805 of the 810 bytes is available for sync TDM packets.

Figure 2D:
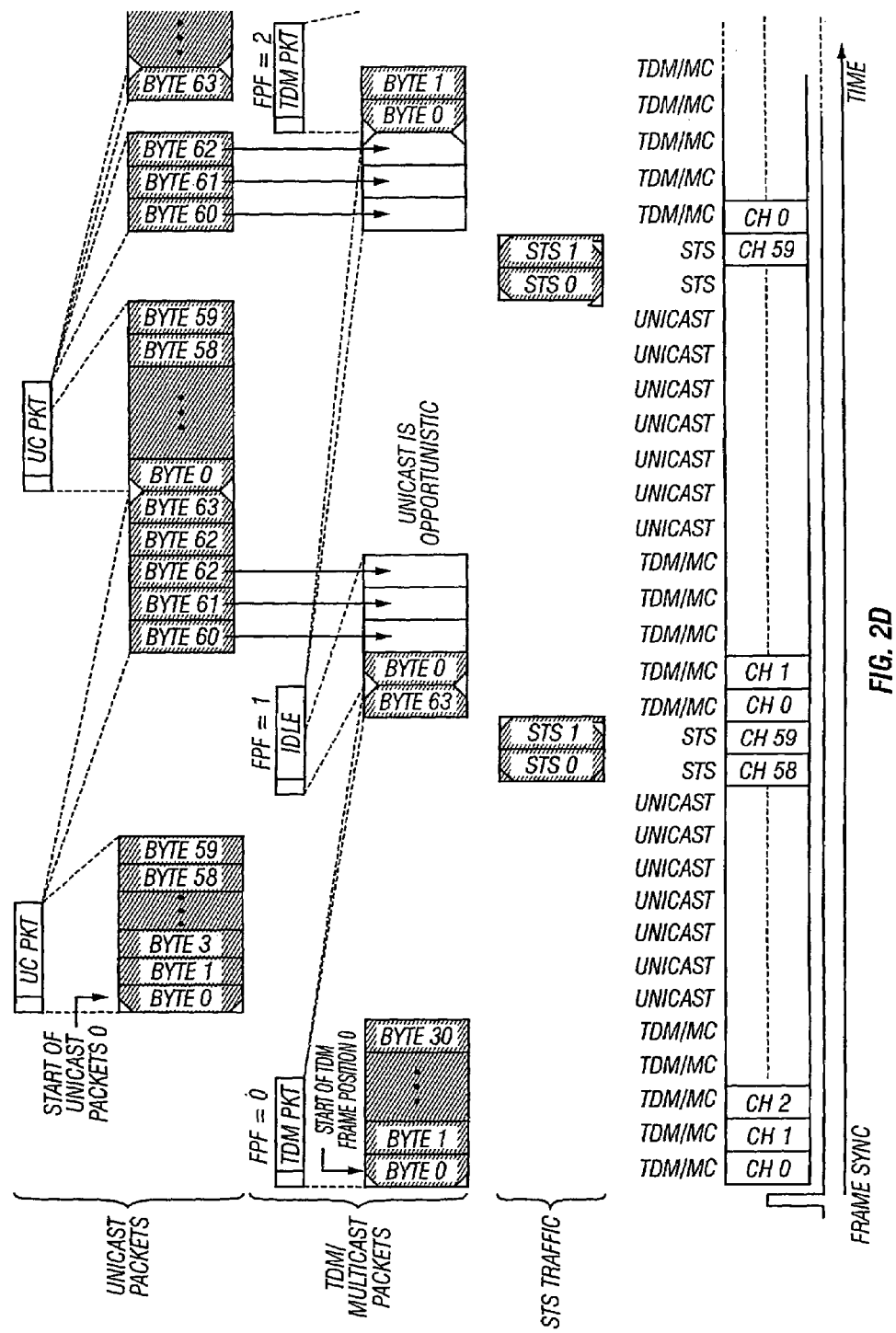
FIG. 2D illustrates the allocation of individual bytes of GigaPoint bandwidth.

FIG. 2D illustrates the allocation of individual bytes of GigaPoint bandwidth on GigaPoint bus 100. Aside from following the channel allocation, async (i.e., Unicast (UC)) packets can use sync (TDM/Multicast) packet slots when sync slots do not carry active packets. In that case, the last 63-bytes of the sync packet slots are used for async packets. As outlined above, GigaPoint bus 100 allocates channels among TDM/Multicast packets, Unicast packets and STS frames. STS traffic is not transported in the form of packets. STS bytes are transported in their allocated byte positions, per the channel map provisioned by software. TDM and Multicast packets are transported in the same channels. The repeating pattern of GigaPoint channels (STS# 0-59) are byte-interleaved. As a result, bytes of TDM/Multicast (TDM/MC) packets can be interleaved with STS and Unicast traffic. Following the frame sync pulse preceding the start of the 125 microsecond frame, the first TDM packet opportunity marks the beginning of the first packet in the frame. From that point, a new packet begins every 64 TDM byte opportunities. Unicast traffic is opportunistic and uses bytes of empty TDM/MC packets. The availability of the empty TDM/MC packets slot for use by opportunistic traffic is marked in the 'packet type' field contained in the first byte, or byte 0, of TDM packets, as described below. This byte is always transmitted. Unicast can thus use only 63 out of 64 bytes of an empty TDM packet (i.e., bytes 1-63).

Each sync packet slot is an opportunity to schedule a TDM, Multicast or Transport Overhead (TOH) type of packet. TOH packets transport elements of SONET TOH from one line unit to another. Since no rate adaption is provided for TDM packet traffic by RC 105, every GigaPoint bus 100 cross-connecting TDM traffic needs to support the same number of channels allocated for sync packets, i.e., have the same number of channels allocated to TDM.

Figure 3A:
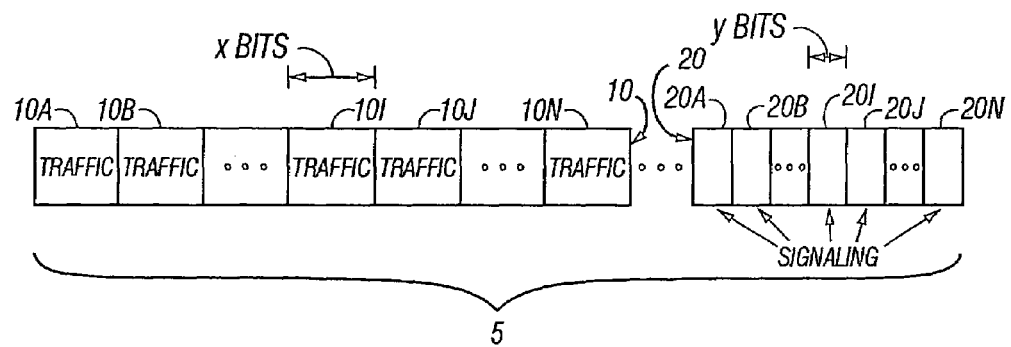
FIG. 3A illustrates bytes of traffic arranged in a contiguous manner, and nibbles of signaling also arranged in a contiguous manner.

Telephony data traffic (e.g., sync TDM packets) is transported within a data transfer system 1, such as the one described above, in the form of messages 5 (FIG. 3A) which may be fixed size (called "cells" or "fixed length packets" (FLP)) or variable size (called "packets") depending on the embodiment. The format of the positions of traffic 10 and signaling 20 in messages 5 is different than previous approaches which interleaved traffic and signaling. In one example, there is one nibble (i.e., four bits) of signaling associated with each byte of voice sample (called a B-channel where one channel is equivalent to one byte).

Each message 5 is formatted in a specific manner. There are samples (i.e., bytes) of telephony traffic 10A, 10B ... 10I ... 10N (wherein A≦I≦N and B=A+1) arranged in the message 5 in a contiguous manner relative to one another (herein the word "contiguous" is intended to mean that each sample 10I is followed immediately by another sample 10J without anything interleaving therebetween, except for the last sample 10N which is not followed by another sample). There is one unit of signaling 20A, 20B ... 20I ... 20N (wherein A≦I≦N and B=A+1) for each sample of traffic. Signaling units 20A-20N are also arranged to be contiguous with one another. The contiguous nature of the packet arrangement allows data and signaling for a given voice channel to be carried within the same FLP.

Figure 3B:
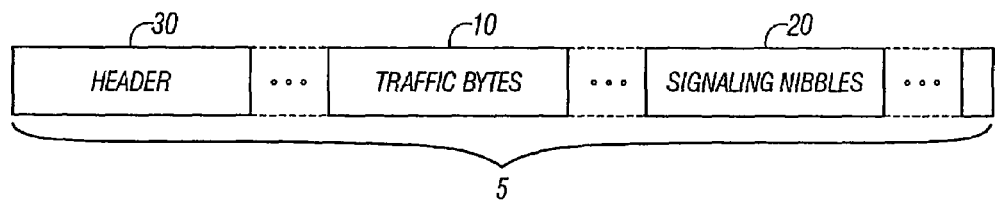
FIG. 3B illustrates one embodiment that combines a header with bytes of traffic arranged with nibbles of signaling, of the type illustrated in FIG. 3A.

One embodiment of message 5 includes a header 30 (FIGS. 3A & 3B) that precedes traffic 10. In this embodiment, there are up to twenty-four contiguous bytes of traffic (10A-10N wherein A=0 and N=23) and twelve contiguous bytes of signaling (20A-20N wherein A=0 and N=11 as there are two bytes of traffic for every byte of signaling, i.e., x=2y). Header 30 is embedded with information used to assist in routing and merging of message 5 (with other messages).

Figure 3C:
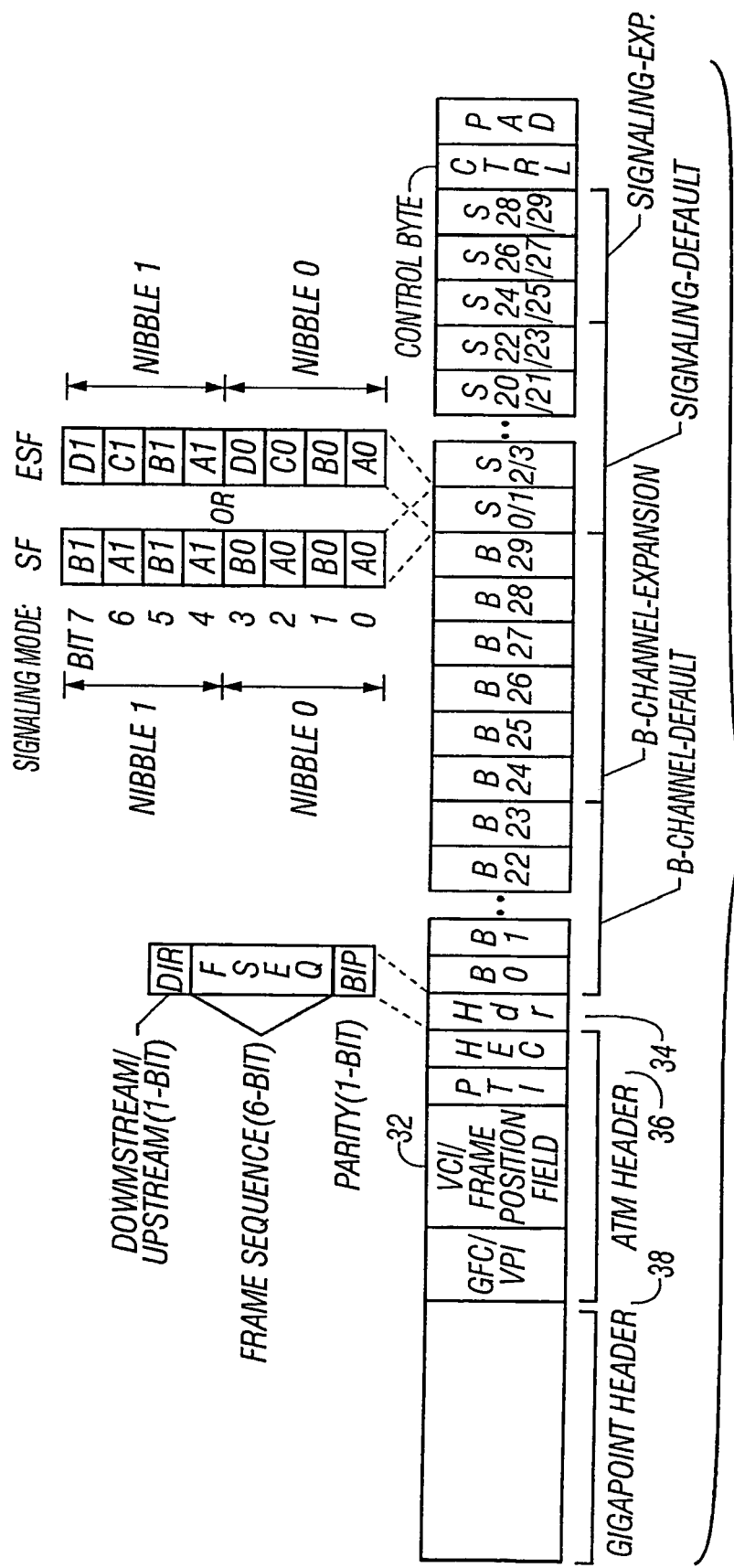
FIG. 3C illustrates an embodiment of a fixed length packet.

FIG. 3C illustrates the data format of another embodiment of a message 5 in the form of a FLP which includes a modified ATM cell that carries TDM payload. The term "payload" is used to indicate user data within a FLP. TDM payload includes DS0 and signaling information. TDM fixed length packets are identified within a 64-byte packet-type word, or FLP envelope 31. FLP envelope 31 includes an 11-byte GigaPoint header 38 prepended to a 53-byte ATM cell. The payload is similar to the unstructured mode of ATM Adaptation Layer Type 1 (AAL-1). See ITU-T Recommendations for ATM, http://www-comm.itsi.disa.mil/itu/r_i36.html#I.363.1. AAL functions in support of constant bit rate, time-dependent traffic such as voice and video. The 53-byte ATM cell is a fixed-length message that includes a 5 byte ATM header 36 and 48 byte payload.

Figure 3D:
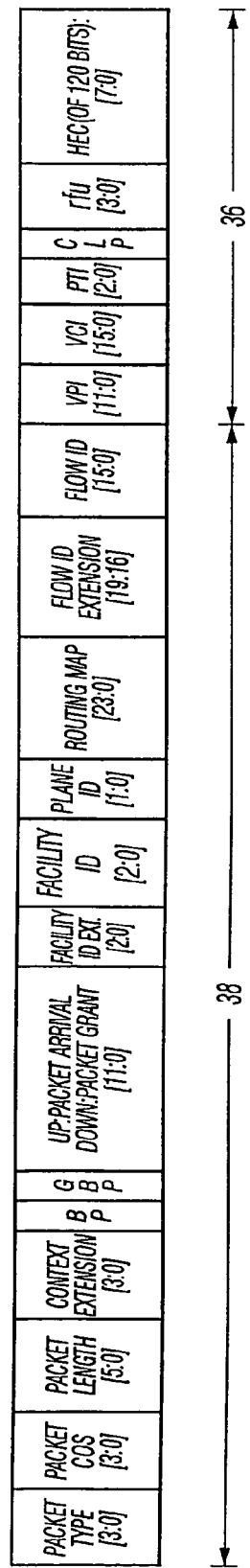
FIG. 3D illustrates a packet header.

As seen in FIGS. 3C & 3D, GigaPoint header 38 carries specific information. Each packet slot within a frame includes a 16-byte header and a 48-byte payload. GigaPoint header 38 further includes the following components: Packet type field; packet class of service (COS); packet length field; backpressure (BP) state bits; extension field for context bits; upstream packet arrival/downstream packet grant field; routing map field; grant BP (GBP) field; Plane ID field; Facility ID field; Facility extension field; Flow ID extension field; and flow identifier field. The sizes and locations of the fields within GigaPoint header 38 may vary. ATM header 36 includes the following components: virtual port identifier (VPI); virtual connection identifier (VCI); payload type identifier (PTI); Cell Loss Priority (CLP); and header error check (HEC). The sizes and locations of the fields within header 36 may vary.

The packet type field identifies data within a packet slot for routing within RC 105 and AP 110. Four bits are used to identify whether synchronous packets are multicast, TDM strictly scheduled, TDM loosely scheduled, or HOST type. A HOST packet is a packet type used for processor communication between the line units and RAP 115. The COS field uses four bits to identify up to 16 levels of class of service for the current packet (though the COS field is not applicable to synchronous traffic). COS can be used to prioritize traffic. For example, when a TDM FLP is transported as asynchronous traffic, it is assigned the highest priority. The packet length field identifies the length of valid payload within the current packet.

The context extension bits are reserved for future use (e.g., additional backpressure or packet status bits). The one-bit BP field identifies a congested state at the remote GigaPoint bus' receive port/interface which may be located at RC 105 or AP 110. At RC 105, an active BP bit indicates a fall or near full queue condition at the downstream line unit. In the upstream direction, an active BP bit indicates a full condition at the upstream receive queue of RC 105. A '0' indicates there is no congestion while a '1' indicates the backpressure is active and that there is congestion. The one-bit grant BP (GBP) field is used on the upstream data transfer bus only. The GBP bit identifies a congested state at the packet grant FIFO (not shown) of AP 110. A '0' indicates grants are enabled while a '1' indicates the RAP arbiter disables further grants and that the grant FIFO of AP 110 is full. Packet arrivals are generated in AP 110 upon receiving a packet from the packet processor. Packet arrival information is stored in the packet arrival field which reports the arrival of packets at the line unit (i.e., all line units with async packets allocated) to the Virtual Output Queue (VOQ) image function within an arbiter located within RC 105. The VOQ contains a set of queues that allow traffic destined to different output ports on RAP 15 or with different priority levels to be stored separately.

Upon receiving a packet grant word from RAP 115, the VOQ retrieves a packet from the queue designated by the grant VOQ ID and sends the packet to RAP 115. The RC arbiter uses the VOQ image to "see" async packets at all line unit ingress. The RC arbiter then performs a multi-stage WRR (waited robin robin) arbitration function to choose which of the line unit packets is to be granted for its destination GigaPoint (which is determined by the Routing Map field of the packet). The packet arrival word appears at RC 105 receive and AP 110 transmit interfaces. The packet grant field is sourced by the arbiter of RC 105. It identifies which packet should be driven over the upstream GigaPoint bus 100 to RC 105 based on the grant VOQ ID. The packet grant word appears at the transmit, or downstream interfaces of RC 105. Because AP 110 at the line unit caches grants, the next upstream packet may not be the last packet granted.

The facility ID extension field extends the facility ID to accommodate up to 64 ports. The facility ID field identifies the destination facility for the current packet at the target line unit. The plane ID field is used by RC 105 and AP 110 for supporting four GigaPoint bus interfaces per line unit slot. RC 105 may be partitioned into four each N-port switching fabric planes. This field allows the APs to specify which switching plane a packet is destined for. The routing map field is used by the ingress line unit and RAP 115 to direct packets to a destination port; indicating which output port the current packet is to be routed to at RC 105 (with expansion capability for up to 24-ports). The routing map serves no purpose in the downstream path of GigaPoint bus 100 as the packet has already reached its destination at the target line unit. Unicast traffic sets one of twenty-four bits. Multicast traffic may set up to twenty-four bits active. Each of the bits corresponds to one of twenty-four ports. A '0' indicates that the packet must not be routed to the corresponding port while a '1' indicates the packet must be routed to the corresponding RC output port.

The flow ID extension field carries flow information in addition to the 16-bit flow ID generated at the Edge Network Processor, Network Packet Processor or AP 110 located in the line unit. Both Edge and Network packet processors are located between the PHY and AP 110. The Edge Packet Processor is located between the DS1 fromer (PHY) and the AP. The Network Packet Processor is between the SONET PHY and AP 110. The physical interface devices are described above. The Edge Packet Processor converts multiple 1.544 Mbps DS1 interface to/from fixed-length packets.

This packet processor may be configured by software to generate generic 53-byte ATM packets, or packets with additional header bytes that are useful in generating and parsing GigaPoint headers. On the DS1 line unit, the Edge Packet Processor is the interface between AP 110 and the DS1 physical interface, a DS1 framer and line interface unit. The Network Packet Processor provides wire-speed, programmable traffic management functions such as queuing, QoS prioritization, traffic shaping and flow ID assignment/interpretation. The Network Packet Processor is the interface between broadband physical interface devices, such as SONET ATM or POS PHYs and AP110. Full use of the flow ID and flow ID extension accommodates up to 1 million flows. RC 105 passes the flow ID extension field and does not process its contents. The flow ID field is used by the line units within the C7 shelf to identify individual flows at the Network Packet Processor. RC 105 passes the flow ID field and does not process the contents therein.

As seen in FIGS. 3C & 3D, ATM header 36 is a standardized multi-byte packet header that includes the VPI, VCI, Payload Type Identifier (PTI), CLP and HEC fields. All synchronous TDM packets within a system carry a VPI which identifies individual virtual paths within the system. The VPI field of packets that merge must be the same value. If the VPI field of a packet is altered at packet ingress, the HEC is updated. Within AP 110, a number of GigaPoint header fields are overwritten. The GigaPoint header HEC is calculated in the outgoing GigaPoint interface on the updated GigaPoint header to ensure that the HEC matches the header values.

Figure 4:
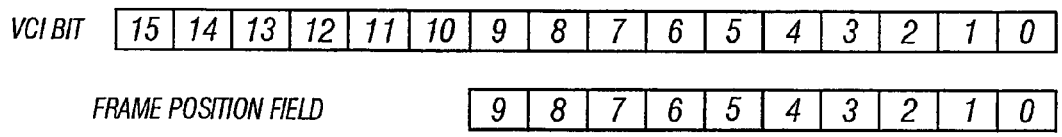
FIG. 4 illustrates VCI and FPF fields.

The HEC is there to ensure that an error at the GigaPoint interface does not cause a packet to be misrouted at the destination RAP or line unit. VCI field 32 of header 30 carries the TDM frame position field and a virtual connection identifier. VCI field 32 is 16 bits long and the Frame Position Field (FPF) is embedded in the least significant or lower 10 bits of VCI field 32, as seen in FIG. 4. VCI 32 identifies specific sessions or data paths (e.g., multiple applications running on one computer might generate multiple connections). For TDM packets, this number serves two purposes. First, VCI 32 controls the position of the packet within the 125 microsecond frame, allowing the system to merge packet payloads. Second, VCI 32 acts as a connection identifier in the system. The FPF is used by strictly-scheduled sync TDM packets to identify the position of a packet within a 125 microsecond GigaPoint frame.

The first byte of the TDM synchronous packet payload of FIG. 3C is the 1-byte Segment and Reassembly (SAR) AAL-1 Header (Hdr) 34 (i.e., the payload header) which is normally intended to identify individual cells within a SAR Packet Data Unit (SAR-PDU). Synchronous TDM FLPs use Hdr byte 34 to carry information such as frame sequence, parity, and direction. Hdr 34 includes a 6-bit frame sequence value (FSEQ), a direction bit (DIR), and a BIP Parity bit. The DIR bit is set to zero ('0') for traffic from the voice switch to the subscriber and set to one ('1') for traffic from the subscriber to the switch. AP 110 can be configured to set this bit to '0' or '1'. When used as a trunk card, AP 110 must be configured to set the DIR bit to '0'. FSEQ identifies the positions of strictly and loosely scheduled TDM packets within a 6 millisecond superframe (i.e., the FSEQ identifies the frame number (0-47) of the packet) which provides a 6 millisecond reference to all line units that can be used to synchronize line units to the superframe boundary.

The 6-bit FSEQ field is incremented every 125 microsecond frame, cycling from 0 to 47 every 6 millisecond period. A 6 millisecond superframe contains forty-eight (48) 125 microsecond frames and the frame sequence field (FSEQ) is reset to zero (0) at the first frame of the superframe. Because the 6-bit frame sequence field rolls over continuously (i.e., the field counts from 0 to 47 and then repeats counting from 0 to 47), the frame sequence information ensures packet alignment to +/−24 frames; referring to the position of the packet over forty-eight (48) 125 microsecond frames. When receiving packets from-the packet processor (or Edge Packet Processor) or data transfer bus 100, the 6-bit frame sequence field is used by the TDM aligner in AP 110 to perform frame synchronization.

The frame sequence field is on a per-virtual circuit (VC) basis meaning that all VCs are not required to be in the same frame sequence at any given time. When transmitting packets towards the packet processor or GigaPoint bus 100, AP 110 sets the frame sequence field to the local frame sequence counter. The frame sequence counter is synchronized to the GigaPoint superframe and common for all VCs. The parity bit is used to detect errors in Hdr byte 34. The parity bit (BIP) is a parity calculation for the seven remaining bits of the header. Software can program AP 110 for even or odd parity. Parity is set to even by default.

As seen in FIG. 3C, B-channel traffic immediately follows Hdr byte 34. The synchronous TDM FLP supports up to thirty B-Channel or DS0 bytes. By default, one DS1 or T1 (24 B-channel) is transported. The six channel expansion capacity allows transport of E1 (30 B-channel) payloads. Further down the packet, fifteen additional bytes transport four signaling bits per B-Channel which includes three bytes of expansion capacity. These signaling bytes, or channels, immediately follow the B-channels. As stated above, there is one nibble (i.e., four bits of signaling) associated with each of the byte voice samples. All nibbles follow one after another sequentially within the packet and the entire block comes right after the B-channel block. As seen in FIG. 3C, superframe (SF) and ESF signaling bits use standard signaling bits (e.g., A1, B1, C1) which are defined in ANSI T1.403.02 standard.

After the signaling channels, there is a Control Byte (CTRL) followed by a pad byte. The Control Byte allows software to send messages from a trunk card to a line unit card (e.g., POTS or DS1) located in a remote shelf and vice-versa. The trunk card interfaces to the voice switch via T1 lines. At the receive end, AP 110 latches the last non-zero Control Byte value on a per-virtual circuit (VC) basis. The interval between packets can be less than 125 microseconds at the receiver. If a packet for a given VC arrives before software has read the previous value, AP 110 overwrites the previous value with the new one. There is a Padding Byte (Pad) at the end of the packet in order to take up space to fill a 64-byte packet.

As previously stated, VCI field 32 of each packet contains a TDM Frame Position Field to identify its position as a source packet for merging. As seen in FIG. 4, VCI field 32 is 16 bits long but the Frame Position Field is found in the lower 10 bits and only used in strictly-scheduled TDM packets.

The 16-bit VCI field and Routing Map of FIG. 3C work in conjunction to merge packets. The frame position field value in VCI field 32 positions the packet within the frame and the Routing Map directs the packet to a particular destination. Packets are merged when they share the same frame position field value and a common destination. The Routing Map determines which destination a TDM packet must be sent to. Each bit in the Routing Map represents a particular destination. For example, the twenty-four ports in RC 105 represents twenty-four destinations for a system with twenty-two line units. All GigaPoints support incoming and outgoing traffic.

The twenty-two ports are for twenty line units, the local RAP card's AP and the redundant RAP card's AP. If two bits (i.e., two destinations) in the Routing Map are set, the packet is multi-cast to the respective two ports representing each destination.

The VCI sequence number is ten bits and positions the TDM packet in time for merging at RC 105. Bits 0-9 are the VCI frame position field while bits 10-15 are the normal fields of the ATM cells' VCI. The C7 system provides a simple mechanism for re-assigning VCI values with no hit on the traffic (i.e., a packet's VCI field can be reassigned to allow it to merge with other sync TDM packets in remote C7 shelves). The method includes replicating the traffic on a second VCI at the source until every destination is re-configured to use the new VCI value. For POTS line units, the host in AP 110 duplicated the traffic. For DS1 line units, traffic is duplicated by the Time Slot Interchange (TSI) function.

Figure 5:
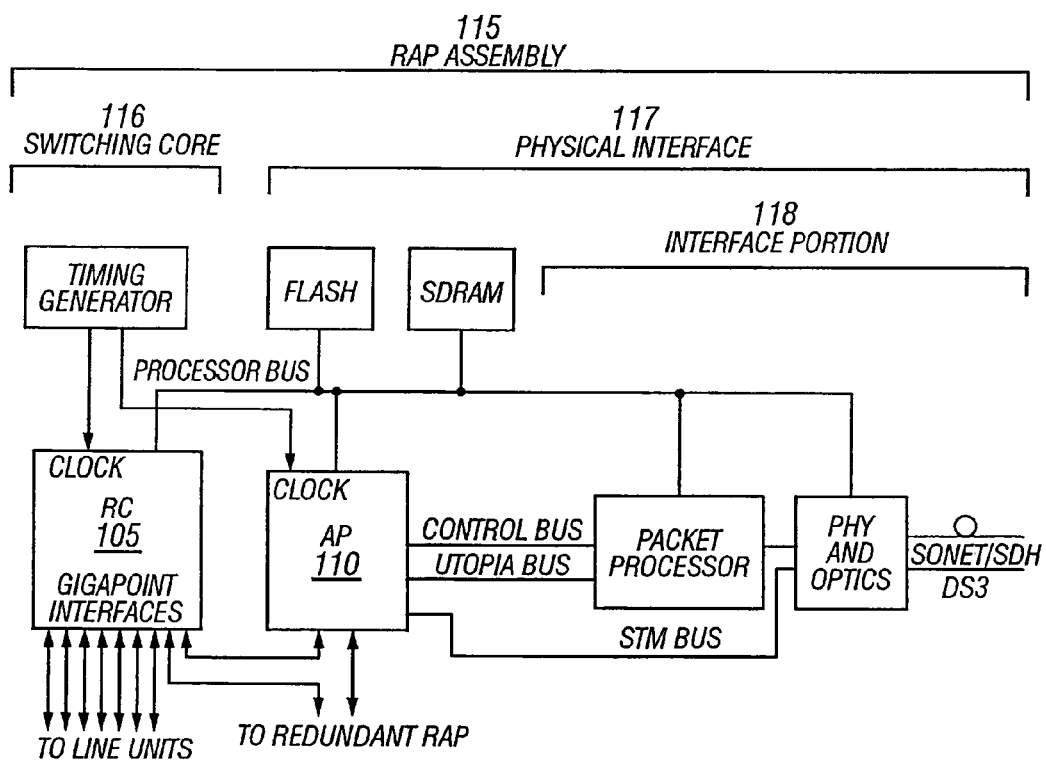
FIG. 5 illustrates the Switching Core and Physical Interface sections of the RAP assembly.

RAP assembly 115, as seen in FIG. 5, may be divided into two regions: Switching Core 116 and Physical Interface section 117. Switching Core section 116 provides the "Core Routing and Arbitration" function for a single shelf. Most of this functionality is provided by RC 105. The Support circuitry for System Timing is also provided by this region as well. The Line section 117 (a.k.a. the "Physical Interface" section) provides the primary "Adaptation and Interface" function for the C7 shelf. Most of this functionality is provided by AP 110, external packet processor and OC-12 Physical Interface (OC12_Phy) ASICs. On a Flex Node-Remote Terminal (Flex Node-RT), Line section 117 provides the interface to Flex Node-Central Office (Flex Node-CO). Flex Node-RT is a C7 shelf, or. shelves co-located, interfacing to subscribers and not the central office/network. Flex Node-CO is a C7 shelf, or shelves co-located, interfacing to a CO/network. Flex Node-CO may also interface to subscriber lines. On Flex Node-CO, Line section 117 provides interface to the. Core Network (i.e., the public switched telecom network (PSTN)). The interface may also serve to link multiple C7 shelves together into a single "node". Line Unit section 117 appears virtually identical to system software as any other Line Unit used in a system Line unit slot. Interface portion 118 of the Line Unit. section 117 may be depopulated in cost sensitive, single shelf systems. Line Unit section 117 resides on RAP 115, primarily to free up extra Line Service slots in the Flex Node-RT.

A Reduced Instruction Set Computer (RISC) processor within AP 110 serves as the main Host processor on RAP assembly 115. On-board SDRAM (greater than or equal to 32 Mbyte) is provided for operational data and program space. On-board Flash (greater or equal to than 64 Mbyte) is provided for program and system database storage. Note that the system database is stored on RAP assembly 115, rather than the Administration and Maintenance Processor (AMP) for redundancy. AMP performs Metallic Test, alarm/status reports, and is the application host for future functions.

The Active side and Protect Side RAPs 115 communicate via a dedicated GigaPoint interface. The interface allows the facility protection switching without requiring RAP processes to transition sides. This "decoupled" method allows the interface software to operate in a similar fashion amongst all protected fiber line functions in the system.

Figure 6:
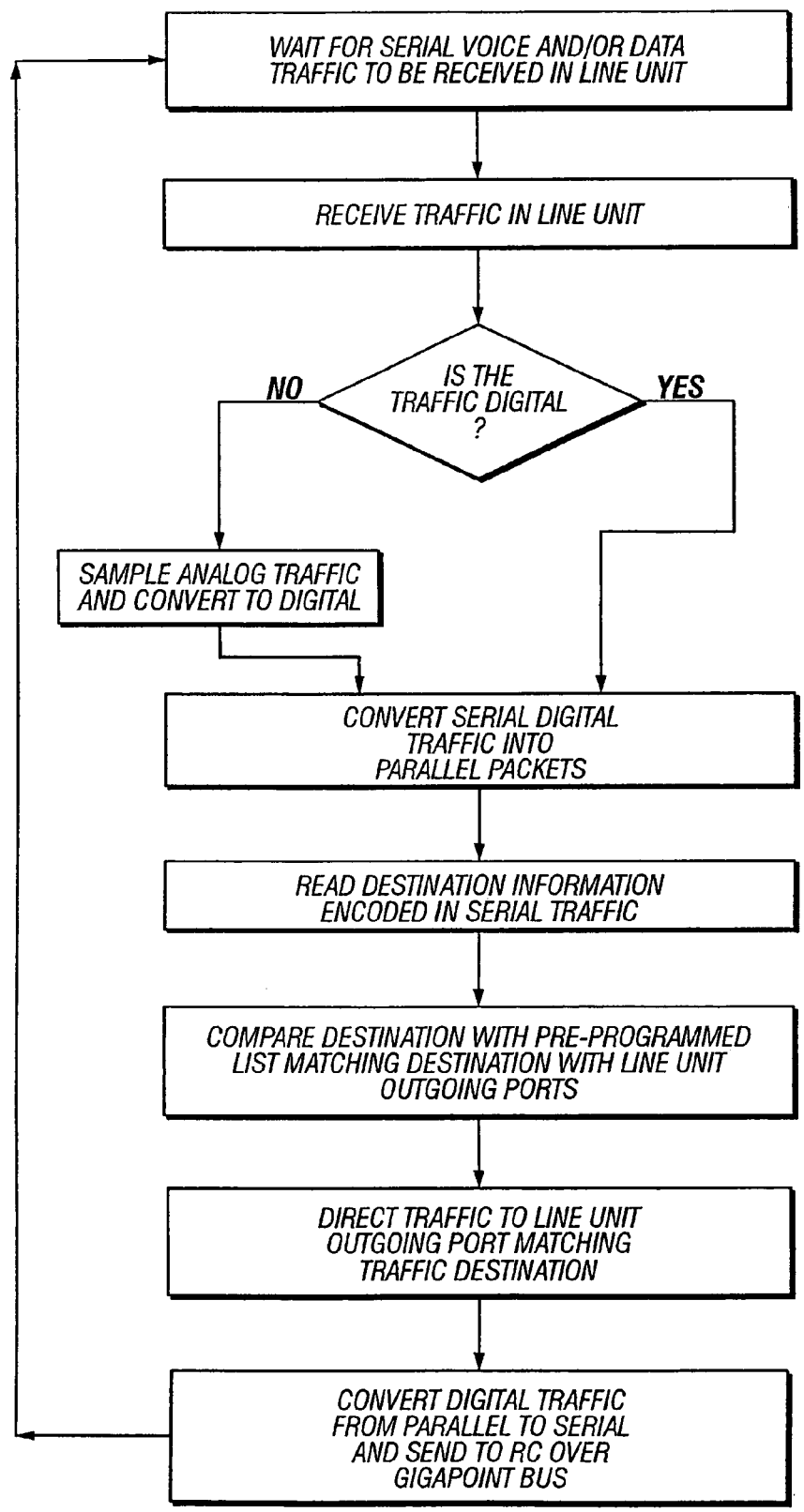
FIG. 6 illustrates the processing of voice and data traffic entering the line unit.

As seen in FIGS. 1B & 6, a line unit processes incoming voice traffic VT and data traffic DT before sending the traffic on to RC 105. Before the voice traffic VT is sent to RC 105, the traffic must be first sampled by a coder/decoder (CODEC) 120 and then converted into packets as the voice traffic is an analog signal coming in to the line unit LU. CODEC 120 samples the voice traffic VT and generates numbers in a manner well-known in the art. Those generated numbers are then converted into packets by AP 110. CODEC 120 is the physical interface chip PHY. AP chip 110 takes up to 24 samples, or 24 bytes of the incoming voice traffic VT, to form a packet. AP 110 then passes the packet out of the line unit LU and then takes other samples to form another packet which AP 110 also passes on. The number of packets generated and the number of voice sample bytes (DS0s) within each packet is configured by software. Typically, an individual packet is generated for each destination line unit. This process continues as long as there is voice traffic VT to sample.

Based on the origin and intended destination of the traffic, AP 110 uses pre-programmed instructions to determine which outgoing port on the upstream line unit LU the packet must be sent through. Incoming DT, typically in the form of ATM cells, is sent directly to AP 110, and not sampled, as data traffic DT is already in digital format. AP 110 sends the digitized voice traffic VT and data traffic DT to a Serializer/Deserializer (SerDes) 125. SerDes 125 converts the traffic from parallel into serial. The number of voice lines to the line unit varies for different line unit types. For example, twenty-four (24) voice lines may be used but on different cards, CODECs may be used that are capable of supporting different numbers of voice lines. Sync TDM packets may be formed in an external packet processor or by the AP's on-chip processor.

Figure 7:
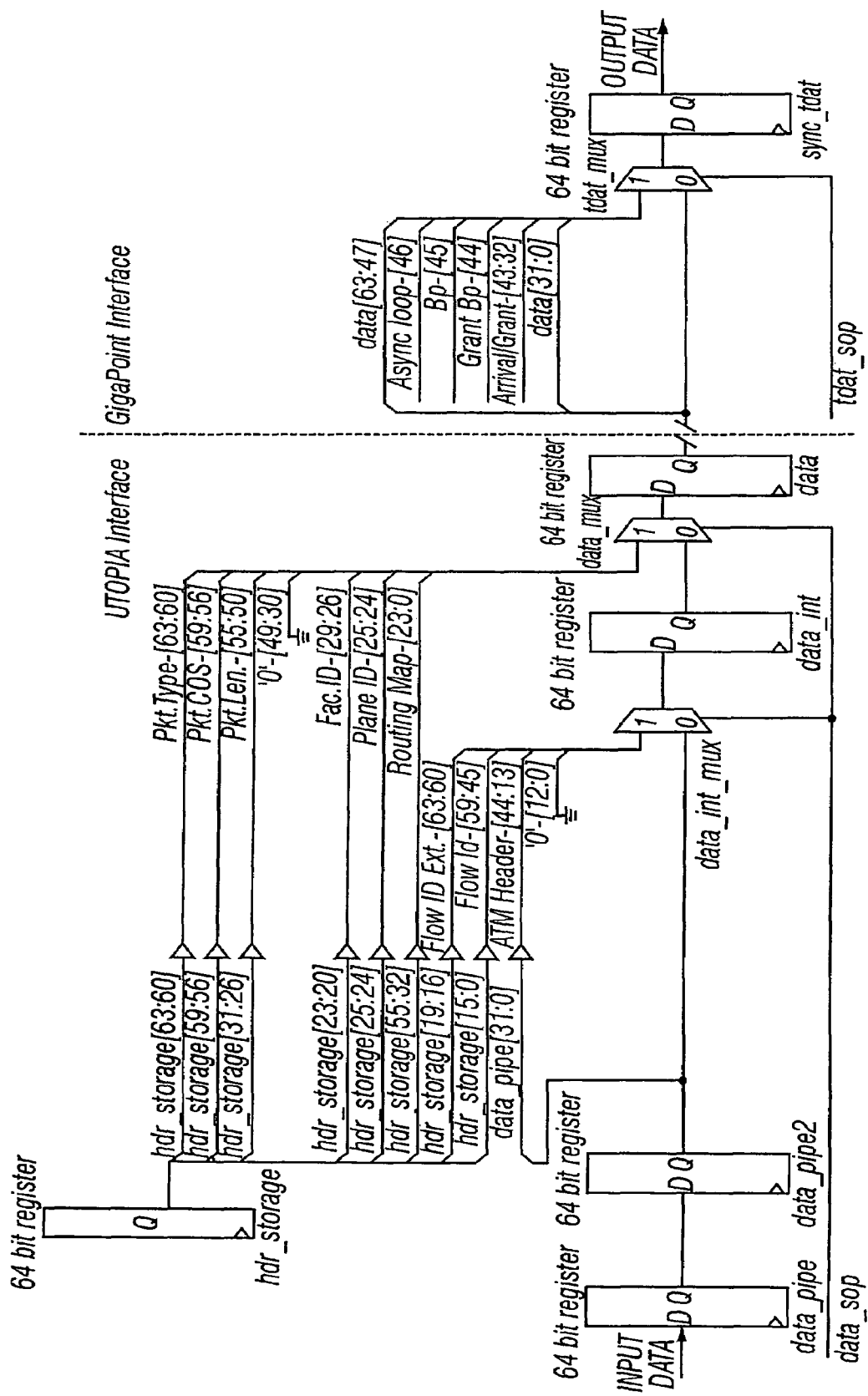
FIG. 7 illustrates GigaPoint packet header generation.

AP 110 provides the first eleven bytes of the GigaPoint header for line cards such as the DSL line unit. FIG. 7 illustrates generation of the GigaPoint header. The 64-byte GigaPoint packet 31, or fixed-length packet (FLP), consists of a 16-byte header and 48-byte payload. In order to interface to $3^{rd}$ party physical interfaces (PHYs) and packet processors, the line unit's AP supports the ATM UTOPIA interface. FIG. 8 shows ATM headers (without HEC) as they are transported within AP 110. AP 110 prepends additional header fields extending the first four bytes of the ATM header to 16 bytes as illustrated in FIG. 9. The GigaPoint header fields are used through the C7 system to identify and route the packet. Note that both FIGS. 8 and 9 represented header in 32-bit format. Packet data is transported in 64-bit word.

AP 110 stores the first four bytes of the ATM header. The ATM HEC byte is checked at the UTOPIA interface of AP 110, but not transported to the GigaPoint header generation logic. A GigaPoint HEC is calculated over the first fifteen bytes of the header. The additional header information is inserted from software-configurable registers within the AP UTOPIA interface. GigaPoint header word 0 bits 14 through 0 and the GigaPoint HEC are inserted at the AP GigaPoint interface.

FIG. 7 details GigaPoint header generation. Input data is received from the UTOPIA ingress FIFO in 64-bit words. The GigaPoint header is transported in two consecutive 64-bit words. At start of packet, a 64-bit "pad" word is registered at the data_pipe register.

On the second clock, the first four bytes of the received ATM header are registered into bits 31:0 of the data_pipe register. During this clock cycle, data_pipe [63:32] are not updated. The hdr_storage register contains software-configured fields, ready for insertion into the data stream.

On the third clock cycle, the data_sop signal is high. This commands the data_int_max and data_mux to select the GigaPoint header fields from hdr_storage. The 32-bit ATM header is also driven from data_pipe2 through data_int_mux. The 64-bit multiplexer outputs are register in the data_int and data registers. At this time, the data register holds the first 64-bit GigaPoint header word and the data_int register holds the second word. The first two 64-bit words of packet payload are registered at data_pipe2 and data_pipe.

For the remaining six clock cycles, data_sop remains low and 64-bit data words are transferred from the ingress FIFO, through data_pipe, data_pipe2, data_int and data registers to AP core logic.

After AP processing, the 64-bit data is driven to the AP GigaPoint (GP) egress interface. At the GP interface, the first packet word arrives coincident with tdat_sop. tdat_sop is high during the first data word. tdat_sop selects GigaPoint header data bits 46 through 32 from the AP core logic. The resulting 64-bit word is stored in the sync_tdat register and driven as output data.

An embodiment of GigaPoint bus 100 is a high-speed point-to-point serial bus design based on Gigabit Ethernet serializer-deserializer (SerDes). Each GigaPoint includes a 16.384 MHz clock and two differential data pairs; transmit and receive. In addition to the single-ended 16.384 MHz clock, there are single-ended 12.352 MHz and PECL differential 19.44 MHz clocks. GigaPoint bus 100 also includes timing reference frame and clock signals. Both AP 110 and RC 105 interface to the GigaPoint through a SerDes 125, either an external SerDes device or an internal logic core.

A GigaPoint bus 100 can be comprised of one, two or four GigaPoint interfaces. A GigaPoint data interface is a four wire interface (i.e., two wires up, two wires down). Each data interface is a serial port with a SerDes (i.e., transceiver) 125 on both sides of the interface.

As stated above, SerDes 125 performs the data parallel-to-serial, serial-to-parallel conversion, and clock extraction for GigaPoint bus 100. SerDes 125 is based on extensions to Gigabit Ethernet Media Independent Interface specifications of IEEE 802.3z. The serial transceiver interface operates at a line rate of 3.1104 Gbps.

Serial GigaPoint buses 100 are AC-coupled. Source termination and coupling are accomplished using external resistors and caps.

The GigaPoint transports four different traffic types: STS channelized traffic; GigaPoint overhead traffic; Synchronous packet traffic; and Asynchronous packet traffic. Overhead traffic occupies five fixed locations within the GigaPoint frame (in GigaPoint channel 0). STS channelized traffic may be assigned to fixed positions within the GigaPoint frame. Packet traffic (sync, async) is transported in the remaining free timeslots.

STS channelized traffic is assigned to GigaPoint bus 100 in STS-1 increments. The STS-1 frame, or STS level one, is the basic building block of the SONET digital transmission hierarchy. The channelized timeslots are fixed in position with respect to the 6 ms GigaPoint Superframe, as shown in FIG. 7.

The GigaPoint interface makes use of the following SerDes features: Transmit PLL clock multiplier; Transmit serializer; Receive PLL clock recovery; Receive de-serializer; and PRBS generator/checker. Byte and frame alignment is accomplished through a SONET framer function at the GigaPoint Media Access Control (MAC).

As seen in FIG. 4, sync TDM packets are scheduled at fixed positions in the frame based on the 10 least significant bits of their VCI field. These 10 least significant bits of the VCI field are also known as the FPF. This tight scheduling allows multiple line units to contribute to a packet by merging payloads at RC 105. The frame position is relative to the GigaPoint 125 microsecond frame. TDM packets, when transported over a SONET interface, do not have nor require a specific alignment to the transport overhead A1A2 positions.

As TDM users are added, DS0 channels become active at specific locations in the sync TDM packet. Consequently, TDM packets may be fully or partially populated with active DS0 channels. Some may even be empty, i.e., all DS0 channels inactive in that shelf.

Figure 10:
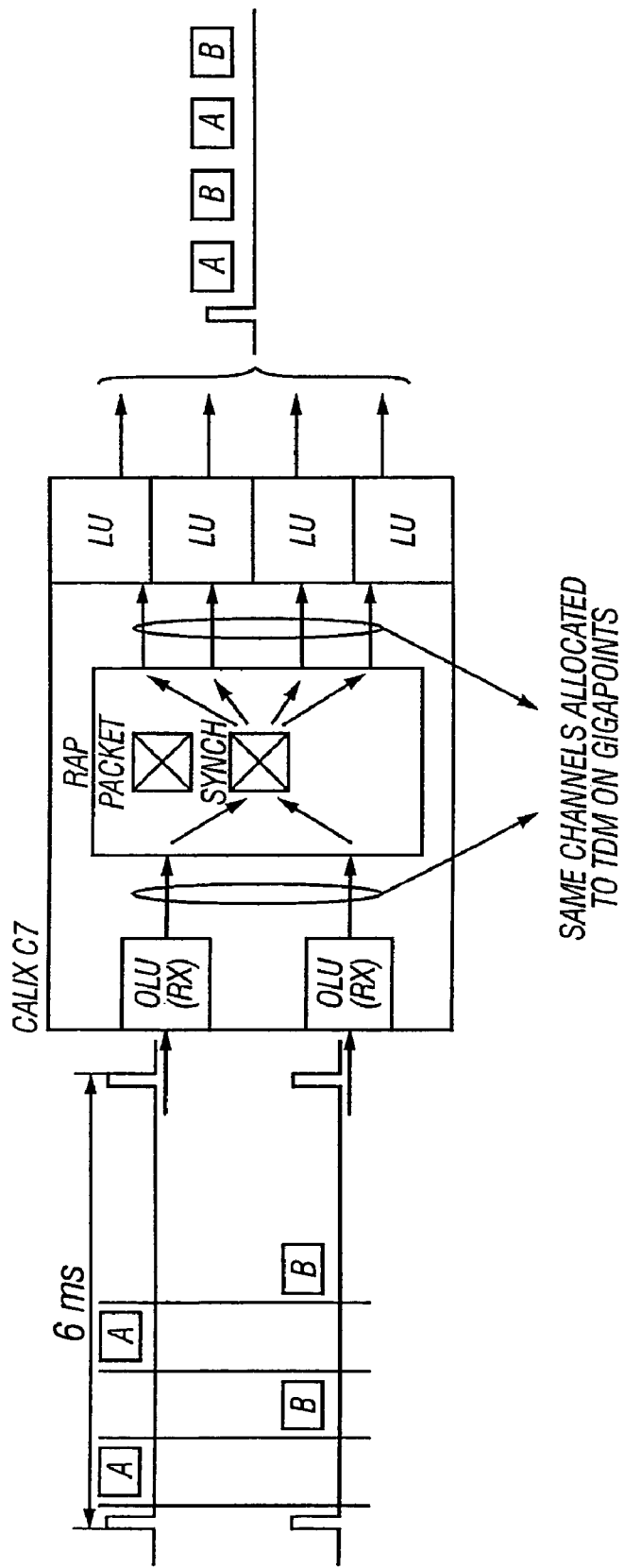
FIG. 10 illustrates Multicast traffic loosely scheduled over a 6 millisecond timeframe.

As seen in FIG. 10, Multicast traffic is loosely scheduled in pre-assigned packet slots on a first-come, first-served basis. Unlike TDM traffic, Multicast is scheduled over a 6 millisecond timeframe.

When a GigaPoint bus 100 operates at a serial bit rate of 3.1104 Gbps, GigaPoint bus 100 has a data capacity of exactly 25% greater than STS-48, or the equivalent of STS-60. Over a 125 us GigaPoint frame, sixty byte-interleaved GigaPoint channels (GP Channels) are designated. Each GigaPoint Channel transports 810 bytes every 125 us frame. These sixty GP Channels are independently configurable for STS, synchronous packet or asynchronous packet transport and are defined as STS channels, Sync channels or Async channel respectively.

GigaPoint overhead consumes five bytes of bandwidth each 125 us frame. Overhead timeslots are transported within the first dedicated packet GigaPoint channel, the overhead channel. As with the other fifty-nine channels, the overhead channel can be provisioned as an STS, Sync or Async channel.

As seen in FIG. 11, the GigaPoint interface transports five traffic type in fixed priority. They are: GigaPoint overhead, STS channels; TDM packets; Multicast packets; and Unicast packets.

Figure 12:
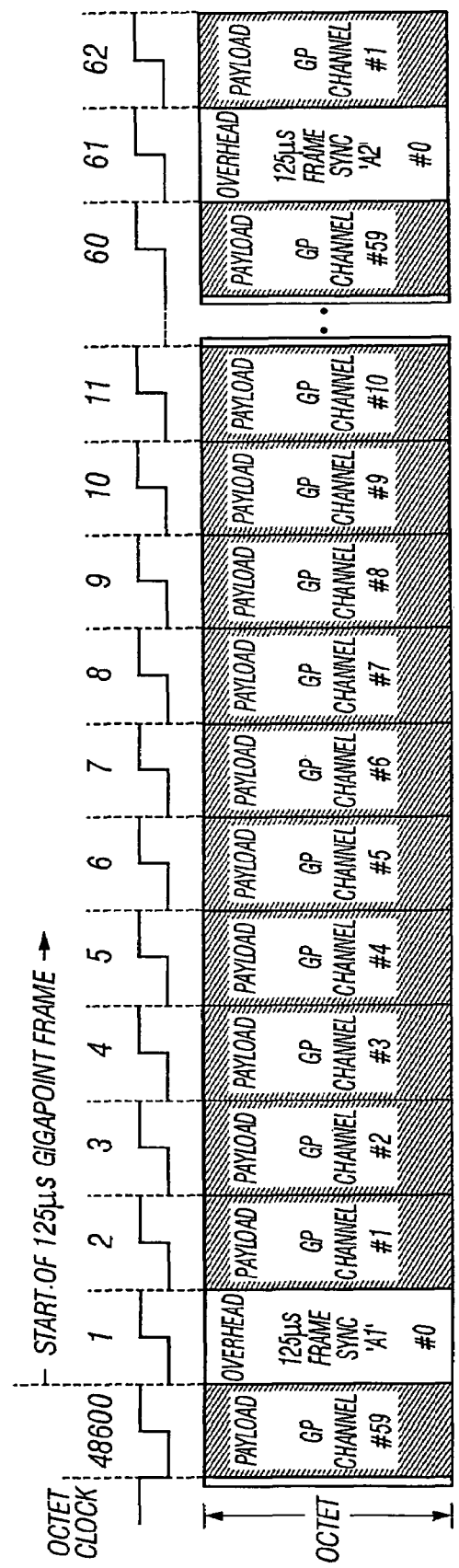
FIG. 12 illustrates GigaPoint data scrambling.

As seen in FIG. 12, GigaPoint data is scrambled based on the SONET scrambling format as defined in GR-253-CORE. All data excluding the A1 and A2 framing bytes in the overhead channel, is scrambled at the GigaPoint transmit MAC and de-scrambled at the corresponding GigaPoint receive MAC.

Each 125 us GigaPoint frame is divided into sixty GigaPoint channels. The sequence of sixty octets, one per GigaPoint channel, is repeated 810 times per frame. A total of 48,600 bytes are transferred each 125 us frame. GigaPoint channels conform to the interleave format, as shown in FIG. 12.

The first GigaPoint channel carries dedicated overhead bytes. These overhead bytes are position in SONET transport overhead (TOH) timeslots. The overhead bytes carry framing, control and status information between the RC 105 and AP 110. As with any other channel, the overhead channel may be provision as an STS, sync or async channel. Because overhead bytes are sent in SONET TOH timeslots, STS payload may be transported in the overhead channel, but the STS TOH will be overwritten with overhead bytes.

Figure 14:
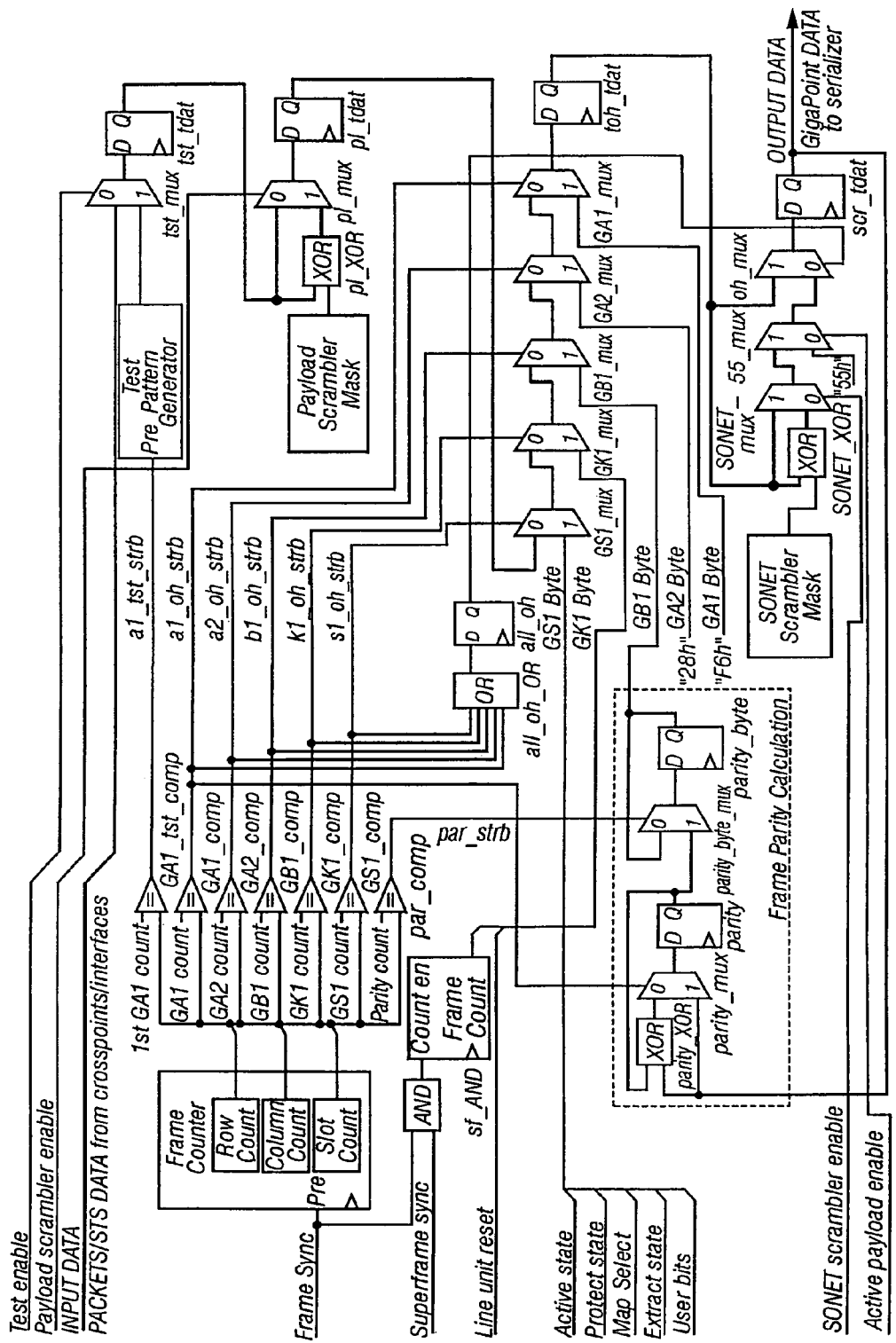
FIG. 14 illustrates GigaPoint generation and data scrambling.

FIG. 14 details the GigaPoint overhead generation and data scrambling. The input data is received from packet processor logic over a 40-bit wide synchronous bus with a 77.76 MHz clock. This input data consists of byte-interleaved STS-1 channels and GigaPoint packets. The input data is modified or overwritten in a four-stage pipeline formed by the 40-bit registers, tst_tdat, pl_tdat, toh_tdat, and scr_tdat. This pipeline incurs a four-clock latency.

The input data is driven to the tst_mux and registered in the 40-bit tst_tdat (Test pattern Transmit Data) register. The tst_mux is controlled by system software. When test_enable is high (a logic '1'), a test data pattern is inserted into the 40-bit data path. When test_enable is low (a logic '0'), the STS/packet data is selected.

In the second pipeline stage, the GigaPoint data may be scrambled. When the Payload scrambler enable is low, the GigaPoint data passes through to pl_tdat (PayLoad Transmit Data) unchanged. When Payload scrambler enable is high, the GigaPoint data is XORed with the. Payload Scrambler Mask and registered in pl_tdat.

This mask is generated from a payload seed preset once every 6 ms superframe. On each subsequent 77.76 MHz clock, the current mask is applied to a polynomial to generate the next mask value.

The third pipeline stage inserts the five overhead bytes into the GigaPoint data path. The timing of these byte insertions is controlled by the frame counter.

The frame counter is clocked by the 77 MHz core clock and preset once every 125 us frame by the align_fs sync signal. The frame counter is divided into three cascading counts, the slot, column, and row counts: The slot count increments on every clock from a count of 0x0 to 0xB (0 to 11 decimal). On slot count rollover (0xB to 0x0), the column count is incremented, once every twelve clocks. The column count is from 0x0 to 0x59 (0 to 89 decimal). The column count corresponds the SONET column number in each STS-1 channel. On column count rollover, the row count increments. The row count, from 0x0 to 0x9, corresponds to the SONET row number. A separate count of frame number, from 0x0 to 0x2F, identifies the current frame (0-47).

Strobe signals are decoded from the slot, column and row counts. These strobes are each active for one clock cycle every 125 us frame. a1_tst_strb and par_strb load preset values into test pattern and parity calculations respectively. a1_oh_strb, a2_oh_strb, b1_oh_strb, k1_oh_strb, and s1_oh_strb each control an 8-bit 2-1 multiplexer.

These multiplexers each overwrite GigaPoint data bits 39:32 on their specific slot/column/row count for one clock cycle each 125 us frame. The a1_oh_strb and a2_oh_strb insert the framing pattern of 0xF6 and 0x28. The b1_oh_strb inserts the frame parity byte.

Frame parity is calculated by XORing GigaPoint data bytes. a1_oh_strb preloads the first GigaPoint data byte (bits 39:32) from Output Data and XORs the remaining bytes (31:0). On each subsequent clock, five bytes are XORed. The result of the XOR is stored in the register, "parity". At the end of the frame, par_strb enables the output of "parity" to be written through parity_byte_mux into the parity_byte register. When par_strb is low, the parity byte value is stored. This stored value is inserted as GB1 by the GB1 mux.

GK1 is made up of the line unit reset bit from an external configuration register and the frame count value. GK1 is inserted when k1_oh_strb is high. Similar to GK1 line unit reset, GS1 consists of bits from external configuration registers. Active state, protect state, map select, extract state, and four user bits are inserted into GigaPoint data bits 39:32 when s1_oh_strb is high. The result of the five 2-1 multiplexers is registered in toh_tdat (Transport Overhead Transmit Data).

The fourth pipeline stage performs two functions; SONET scrambling and insertion of the 0x55 idle data pattern. GigaPoint data from the toh_tdat register is driven to the SONET_mux and SONET_XOR. When the SONET scrambler enable bit is set high by software, the GigaPoint data is XORed with the SONET scrambler payload. When the SONET scrambler enable is low, GigaPoint data is driven to the 55_mux unchanged.

The SONET scrambler mask is generated from a fixed value that is inserted during the first 40-bit of each 125 us frame. A standard SONET GR-253 $x^7+x^6+1$ polynomial is applied to the mask on each remaining 77.76 MHz clock of the frame.

The 55_mux allows insertion of a idle 0x55 data pattern into the GigaPoint data stream. The idle pattern is inserted for each GigaPoint channel that is not configured for packet or STS traffic or when that GigaPoint payload is disabled. At line unit insertion, the GigaPoint data is set to the idle pattern until initialization is complete. The output of the 55_mux is driven to the oh_mux.

The oh_mux ensures that the overhead bytes are not overwritten by the idle pattern and the GA1 and GA2 bytes are not XORed with the SONET scrambler mask. When the SONET scrambler is disabled, the oh mux selects the toh_tdat register output during all five overhead clock cycles. When SONET scrambling is enabled, the oh_mux selects the toh_tdat output for only the GA1 and GA2 overhead clock cycles. The resulting GigaPoint data is registered at the 40-bit scr_tdat (Scrambler Trasmit Data) register. The scr_tdat register's output is driven to the GigaPoint serializer. There it is driven over GigaPoint bus 100 in a single-bit serial stream at 3.1104 Gbps.

Figure 15:
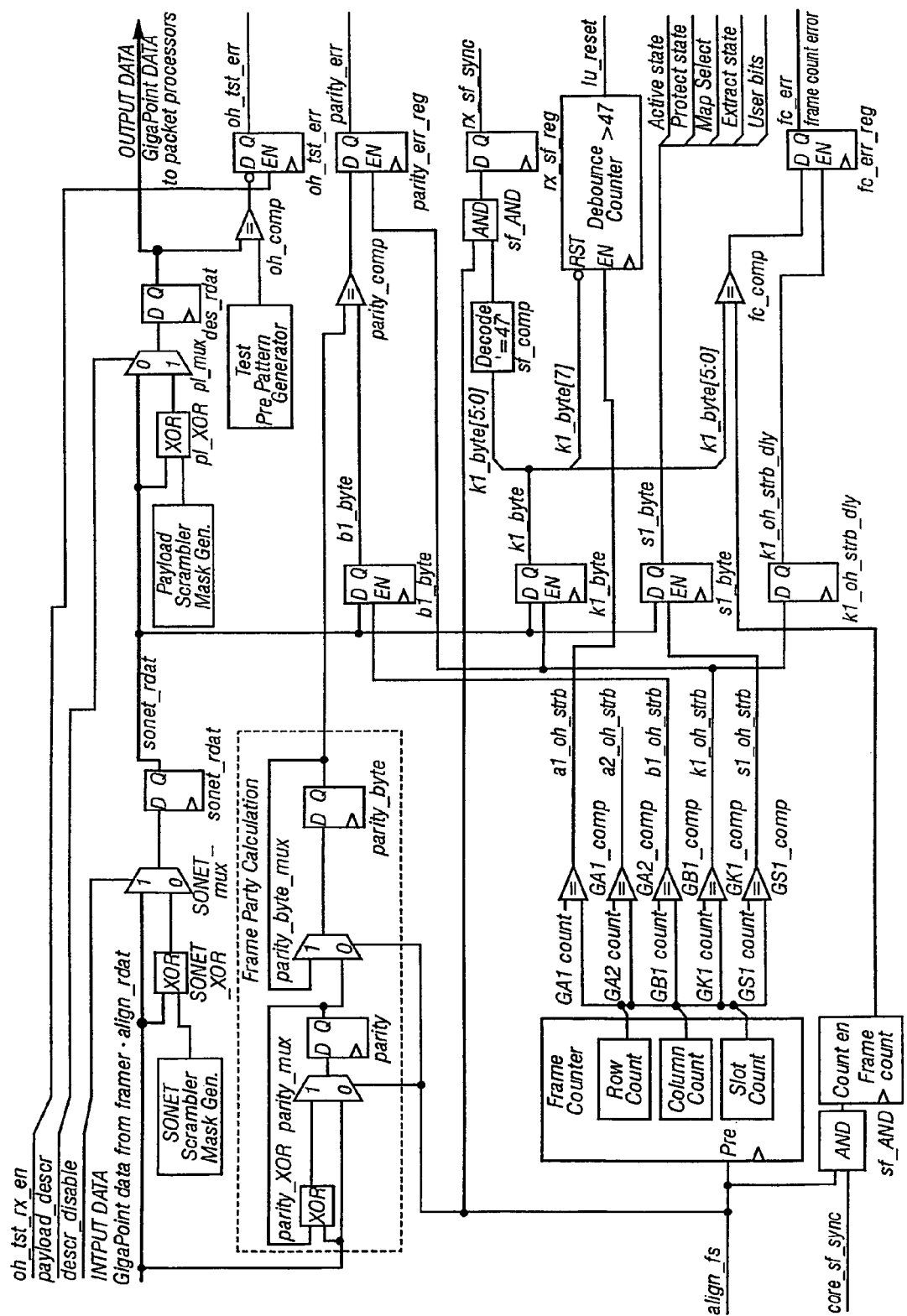
FIG. 15 illustrates GigaPoint capture and data descrambling.

FIG. 15 details the GigaPoint overhead capture and data descrambling. The input data is received from packet processor logic over a 40-bit wide synchronous bus with a 77.76 MHz clock. This input data consists of byte-interleaved GigaPoint overhead, STS-1 channels and GigaPoint packets. The GigaPoint input data is descrambled and three GigaPoint overhead bytes (GB1, GK1 and GS1) are captured. SONET descramble, overhead byte capture and payload descramble are accomplished in a two-stage pipeline formed by the 40-bit registers, sonet_rdat and des_rdat. This pipeline incurs a two-clock latency.

The input data is received from the external GigaPoint byte aligner module. The byte aligner aligned the align_rdat bus and produces the align_fs signal by detecting the presence of the GA1 and GA2 overhead bytes in the receive data stream from the deserializer.

Input data is driven to the SONET_XOR and SONET_mux. SONET_mux selects the input data, or the input data XORed with the SONET scrambler mask based on the descr_disable signal from an external configuration register. The SONET_mux output is register in the 40-bit sonet_rdat register.

Overhead bytes are captured from the sonet_rdat register output at specific clock cycles timed by the frame counter.

The frame counter is clocked by the 77 MHz core clock and preset once every 125 us frame by the align_fs sync signal. The frame counter is divided into three cascading counts, the slot, column, and row counts. The slot count increments on every clock from a count of 0x0 to 0xB (0 to 11 decimal). On slot count rollover (0xB to 0x0), the column count is incremented, once every twelve clocks. The column count is from 0x0 to 0x59 (0 to 89 decimal). The column count corresponds the SONET column number in each STS-1 channel. On column count rollover, the row count increments. The row count, from 0x0 to 0x9, corresponds to the SONET row number. A separate count of frame number, from 0x0 to 0x2F, identifies the current frame (0-47).

Five strobe signals are decoded from the slot, column and row counts. These strobes are each active for one clock cycle every 125 us frame. k1_oh_strb, and s1_oh_strb each enable an 8-bit register. These registers are enabled to read sonet_rdat [39:32] one time each frame. The captured overhead bytes are further processed after capture. GB1 is the GigaPoint frame parity byte.

Frame parity is calculated by XORing GigaPoint data bytes. align_fs preloads the first GigaPoint data byte (bits 39:32) from Output Data and XORs the remaining bytes (31:0). On each subsequent clock, five bytes are XORed. The result of the XOR is stored in the register, "parity". At the next frame, align_fs enables the output of "parity" to be written through parity_byte_mux into the parity_byte register. When align_fs is low, the parity byte value is stored. This stored value is compared to captured value at b1-byte and the compare output is registered in parity_err_reg when k1_oh_strb is high.

The GK1 byte is captured from the GigaPoint data when k1_oh_strb is high. Bytes 5:0 is k1_byte are compared to the local frame count and the result is registered in fc_err_reg (Frame Count Error) on the clock cycle following the GK1 clock cycle. The frame count bytes (k1_byte[5:0]) are also driven to a decoder. When the frame count equals 47 decimal and align_fs is high, a superframe pulse is generated. This pulse is registered at rx_sf_reg and drive externally as rx_sf_sync. GK1 bit 7 is the line unit reset bit. It is driven to a debounce counter. When an active line unit reset is received (logic '1'), the debounce counter is released from reset. The debounce counter count increment when a1_oh_strb is high, once each frame. If the debounce count is not reset for greater than 47 frames, the lu_reset signal is high. This debounce function reduces the likelihood that spurious bit errors on the serial GigaPoint bus can cause an inadvertent line unit reset command.

The GS1 overhead byte is captured in the s1_byte register when s1_oh_strb is high. GS1 bits are driven to external logic.

The GigaPoint interface supports transport of up to 60 STS-1 channels. Each channel is assigned 810 timeslots within a 125 us GigaPoint frame. These timeslots are fixed in position relative to the GigaPoint frame. Channels are configurable on a per STS-1 basis at the line unit and RAP 115. When STS channels are not allocated for STS-1 transport, they revert to packet traffic. When STS-1 traffic occupies the maximum of 48 channels, twelve remaining channels transport overhead and packet traffic.

STS payload may be transported locked or floating. Locked payload STS traffic is defined as STS-1 with locked SONET transport overhead and a fixed value in that overhead's H1, H2 and H3 payload pointers of '00'. The fixed payload pointers position the path overhead directly after the transport overhead on every frame. Floating traffic is transported with locked SONET transport overhead and floating SPE (path overhead and payload).

Synchronous packets are 64-byte packets that are transported over the GigaPoint in synchronous GP channels. Synchronous packets are in fixed position relative to GigaPoint frame sync. TDM and multicast FLPs are synchronous packets.

Each TDM FLP assignment dictates the frame position of one packet per frame. In order to enable TDM FLP merging, TDM FLPs assigned to the same TDM packet slot arrive at the RC GigaPoint simultaneously. TDM FLPs are switched through the synchronous crosspoint of RC 105.

Multicast packets are assigned from remaining synchronous packet slots as a means to allocate specific multicast bandwidth. While synchronous packet slots assigned to multicast are fixed in position to the GigaPoint frame, a specific packet slot may carry multicast packets of different flows on subsequent frames. Switching through the synchronous cross-point of RC 105 simplifies alignment of multiple output GigaPoint interfaces.

Figure 13:
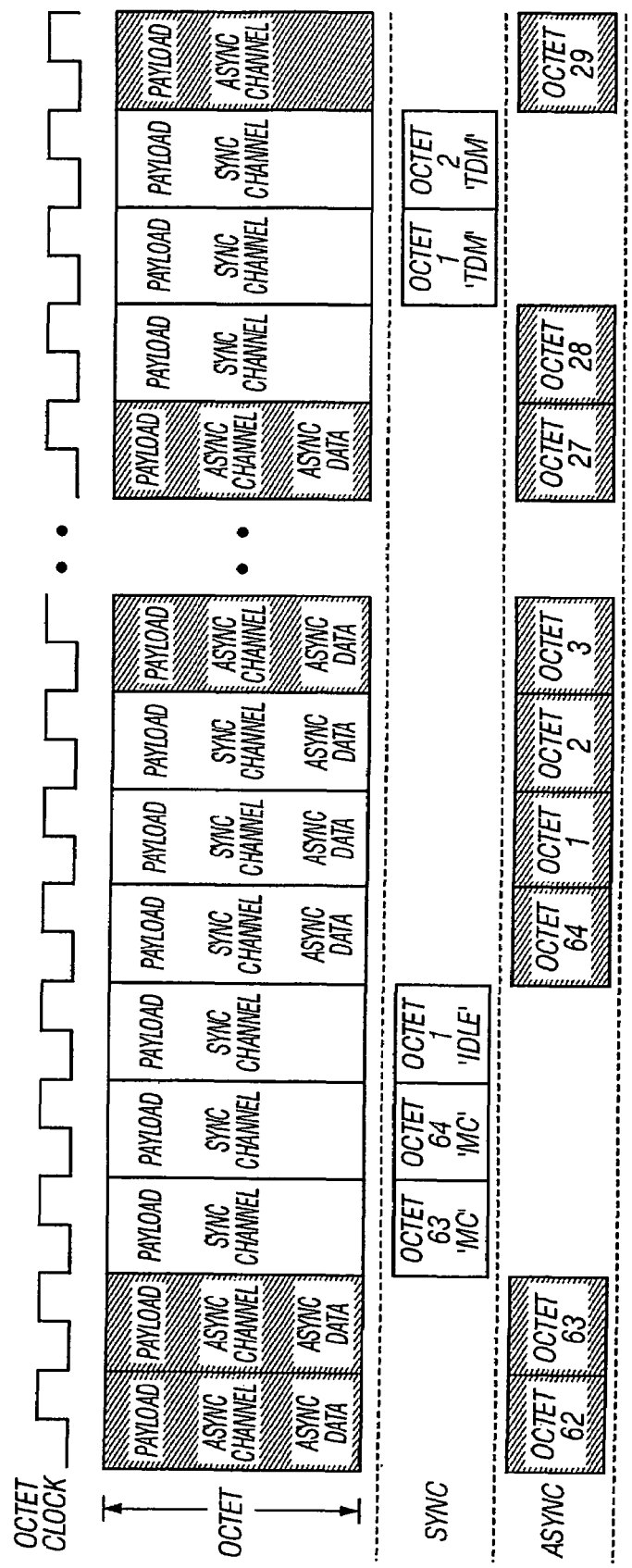
FIG. 13 illustrates simultaneous transport of synchronous and asynchronous traffic.

As seen in FIG. 13, synchronous packet slots not occupied by TDM or multicast packets are available for asynchronous unicast packets. When a synchronous packet slot is not carrying TDM or multicast packets, the first octet of the packet slot carries the synchronous packet type field. The packet type value is '00' indicating an idle synchronous packet. This single octet, along with the current state of asynchronous transport, allows GigaPoint receive logic to differentiate between synchronous and asynchronous octets. The remaining 63 octets are available for transport of asynchronous traffic.

Unlike synchronous packets, unicast packets need not start on synchronous packet slot intervals. A unicast packet started in an asynchronous packet slot may continue through synchronous packet slots. Asynchronous packets may start is idle synchronous octets. This opportunistic use of free synchronous packet slots is detailed in FIG. 13.

FIG. 13 illustrates simultaneous transport of synchronous and asynchronous traffic. The synchronous channels transport a multicast packet followed by idle and TDM packets. After the multicast packet completes at octet 64 (1-64), the idle packet type field is sent, marking the remaining 63 octets as available for asynchronous traffic. The current asynchronous packet completes is a "free" synchronous timeslot and another asynchronous packet begins.

Asynchronous traffic continues to make use of the idle synchronous packet slot. The next synchronous packet slot carries a TDM packet. During the TDM packet transport, asynchronous traffic is transported exclusively in asynchronous GigaPoint channels.

Asynchronous channels are used to carry information to be transferred in packet crosspoint. Unicast packet traffic is transported in fixed packet slots, but is not frame aware. Unicast packets are transported in Async GigaPoint Channels and may also occupy timeslots within Sync GigaPoint Channels when TDM or multicast packets are not present. Unicast traffic is transported through the asynchronous cross-point of RC 105. Unicast traffic carries the lowest priority through RC 105.

Figure 17:
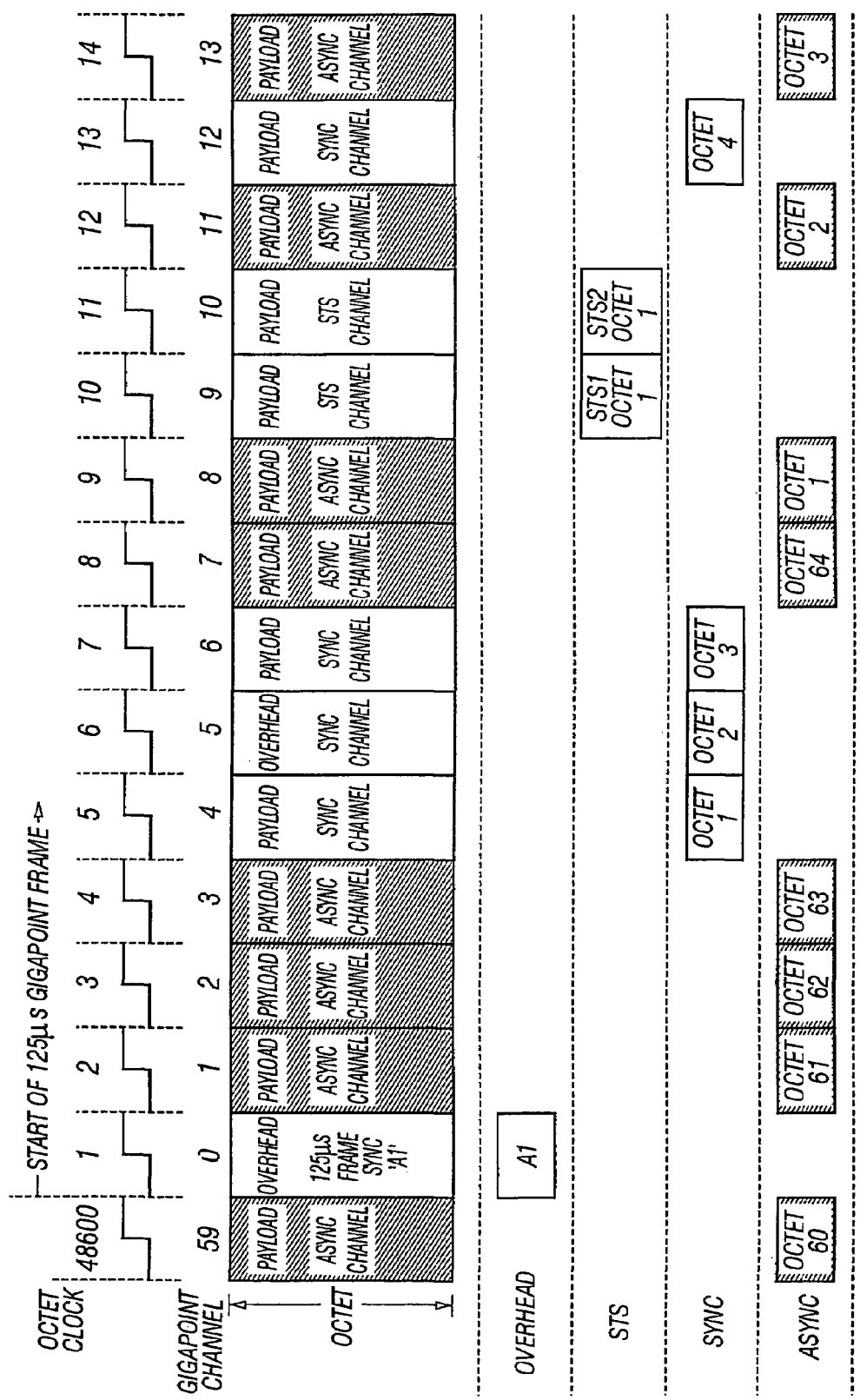
FIG. 17 illustrates the provisioning of bandwidth.

GigaPoint traffic is transported in the following priority: GigaPoint overhead; STS channels; Synchronous packets; and Asynchronous packets. As detailed in FIG. 17, overhead timeslots in the overhead carry the highest priority. Overhead timeslots are fixed in position in hardware. The remaining bandwidth in the overhead channel may be provisioned for use by STS, synchronous or asynchronous traffic.

STS channels are provisioned by software, but once provisioned, these timeslots may not be used for transport of any traffic other than STS.

Synchronous packets are transported in timeslots assigned to fixed positions within the GigaPoint frame. Synchronous and Asynchronous packets may be byte interleaved.

Asynchronous packets are transported primarily over asynchronous channels. Asynchronous packets may use synchronous channel timeslots when synchronous traffic is not present. Asynchronous packets have no fixed start and stop position relative to the GigaPoint frame. However, the first octet of an asynchronous packet always occupies the first available asynchronous timeslot subsequent to the 6 ms GigaPoint superframe. The first available asynchronous timeslot may be a timeslot provisioned for asynchronous traffic, or an available timeslot in an idle synchronous packet slot.

The GigaPoint interface transports packet traffic in remaining timeslots not utilized by overhead bytes and active STS channels. Packet traffic is transported in 64-byte fixed-length packets (FLPs) which is optimal for ATM cell transport. Packet types include: Idle Packets; OAM Packets; Unicast TDM Packets; Unicast Packets; TOH Packets; Host Packets; Multicast Packets; and Sync TDM Packets.

As outlined above, GigaPoint FLPs are in fixed positions, or packet slots, relative to the GigaPoint frame and number of active STS channels. The utilization of active STS channels determines the maximum packet capacity. FIG. 18 displays packet capacity per GigaPoint frame.

Idle packets carry no data payload. They are transported over GigaPoint 100 solely to transport packet arrival, packet grant and backpressure information between RC 105 and AP 110.

Unicast packets carry data other than TDM as point-to-point flows through the asynchronous crosspoint of RC 105. Unicast packets are transported over asynchronous GigaPoint channels and "free" timeslots in synchronous channels.

TOH packets carry portions of the SONET transport overhead between SONET interface line units within the C7 system. The TOH packets carry both SONET Engineering Order Wire (EOW) PCM samples and SONET Data Communications Channel (DCC) data. TOH packets may be transported as strict-scheduled or loose-scheduled sync packets or as asynchronous packets.

Host packets transfer C7 processor-to-processor data through dedicated virtual circuits or SONET DCC channels. Host packets may be either synchronous or asynchronous packets.

Multicast packets transport data from one GigaPoint interface to many GigaPoints. Multicast packets are transported through the synchronous crosspoint of RC 105. They share synchronous channels with sync TDM packets.

Synchronous TDM packets are transported over synchronous GigaPoint channels. They are assigned to specific timeslots by the ingress line units. Synchronous TDM packets may be merged and/or multicast. At an egress optical interface, these packets are stored in a high priority CoS queue.

Figure 16:
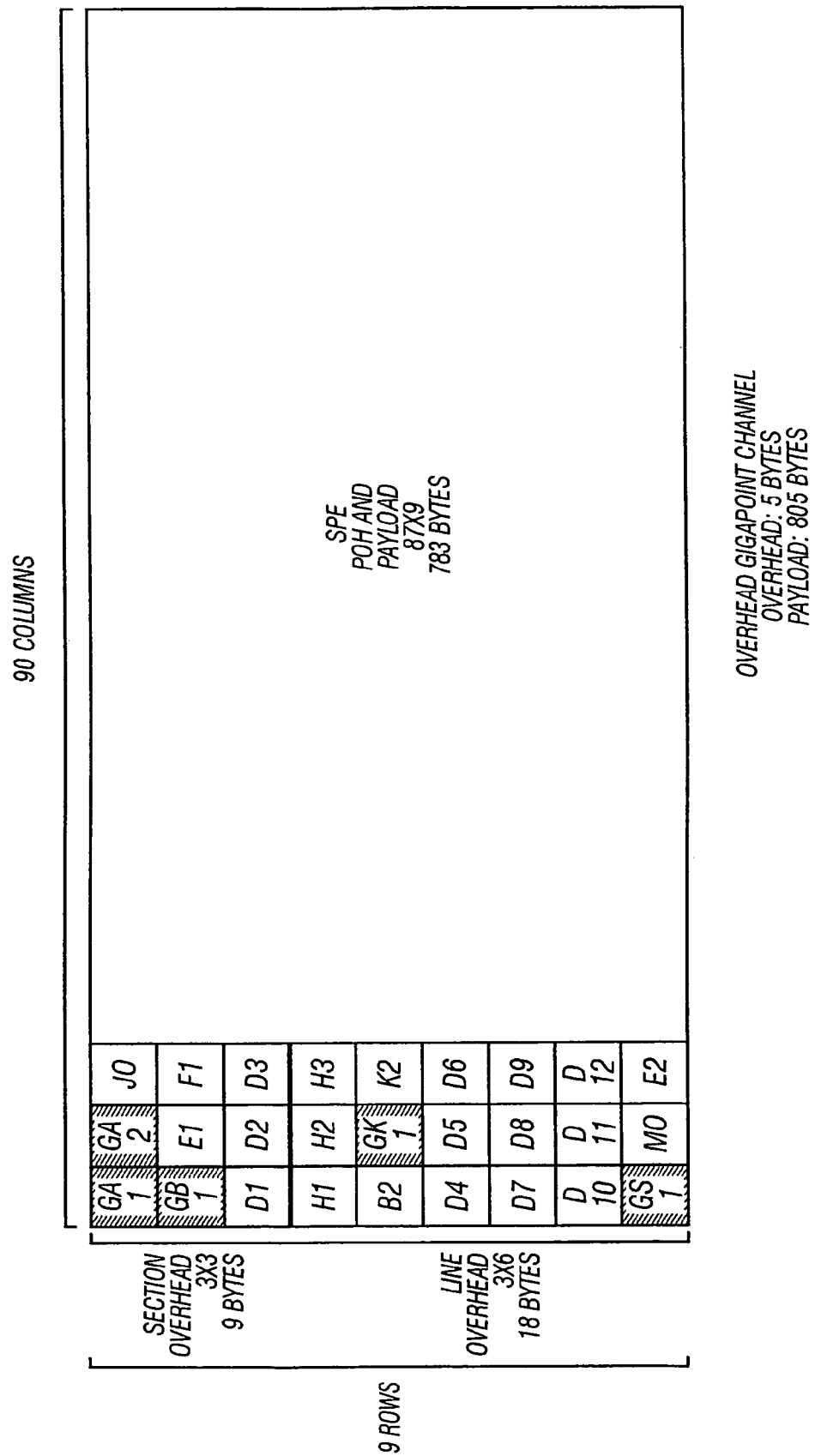
FIG. 16 illustrates GigaPoint overhead byte position.

GigaPoint overhead traffic is transported in the overhead channel, GigaPoint channel 0. Five bytes of overhead traffic are transported over the GigaPoint every 125 us frame. While these bytes occupy locations similar to SONET transport overhead bytes, they are not SONET bytes. The byte positions within the frame are intended to allow transport of SONET STS-1 frames over GigaPoint 0 without interference with SONET overhead that is not regenerated at the line unit egress. The remaining 805 bytes of GigaPoint channel 0 are available for STS, sync packet or async packet traffic. GigaPoint overhead byte position in the frame is defined in FIG. 16. GigaPoint overhead bytes correspond in position to SONET section and line overhead.

As seen in FIG. 19, overhead data includes 125 us framing (GA1/GA2), frame integrity (GB1), and GigaPoint status/control (GK1/GS1). The frame integrity byte ensures that the previous 125 us frame of data within the overhead channel was transported without a bit-interleaved parity (BIP-8) error. The GK1 timeslot transports reset and frame count.

The GS1 transports active/protect state of the RAP to the line units. The GigaPoint channel map page select is transported both to and from the line units. GS1 transports an 'extract' bit. This bit indicates that the remote line unit or RAP 115 is being extracted from the card cage (also called "chassis"). This bit normally goes active about a millisecond before the line unit is removed, e.g. because the pin is shorter than other pins in a connector between the chassis and the line unit. An early extraction signal is generated by the shorter pin being normally pulled up, and when the line unit is extracted, the pin loses power, and is no longer pulled up and instead is pulled down to zero, thereby to generate the extraction signal.

On receipt of such a signal from a line unit, the active RAP performs actions necessary to handle the extraction, e.g. squelches the signals from a port to which the line unit being extracted is connected. Moreover, the RAP sends out an AIS signal (all 1s) to a destination port to which the extracted line unit was connected, so as to prevent a facility protection switch, and also informs a standby line unit to take over the functions of the extracted line unit.

So, the local GigaPoint transmitter should be disabled to avoid driving an 'un-terminated' GigaPoint. An additional 4-bit user field is register accessible to software in both directions.

The GK1 GigaPoint overhead byte includes four user bits. These bits are transported one time for each 125 us GigaPoint frame. A change in the state of the user bits, from frame to frame, generates an interrupt to line unit/RAP software.

The four user bits with the GK1 GigaPoint overhead byte are currently used by system software as described in FIG. 21. GigaPoint bus 100 supports three framing concepts: GigaPoint frame/superframe synchronization; GigaPoint STS channels; and Packet slots. GigaPoint frames are identified by reception of the A1/A2 SONET framing pattern on a scrambled GigaPoint receive stream. A1 and A2 octets occupy the first two timeslots of the overhead GigaPoint channel and appear once every 125 us GigaPoint frame. The A1/A2 pattern is 'F6h/28h'.

In addition to the 125 microsecond frame sync, the overhead timeslot also carries 6 ms superframe information in K1 overhead bits 5:0. Over 6 ms, K1 [5:0] increments by '1' each frame to a maximum count of '2Fh' on the frame that precedes superframe sync. As with A1/A2, K1's position within the 125 us frame is consistent with the SONET standard.

Figure 20:
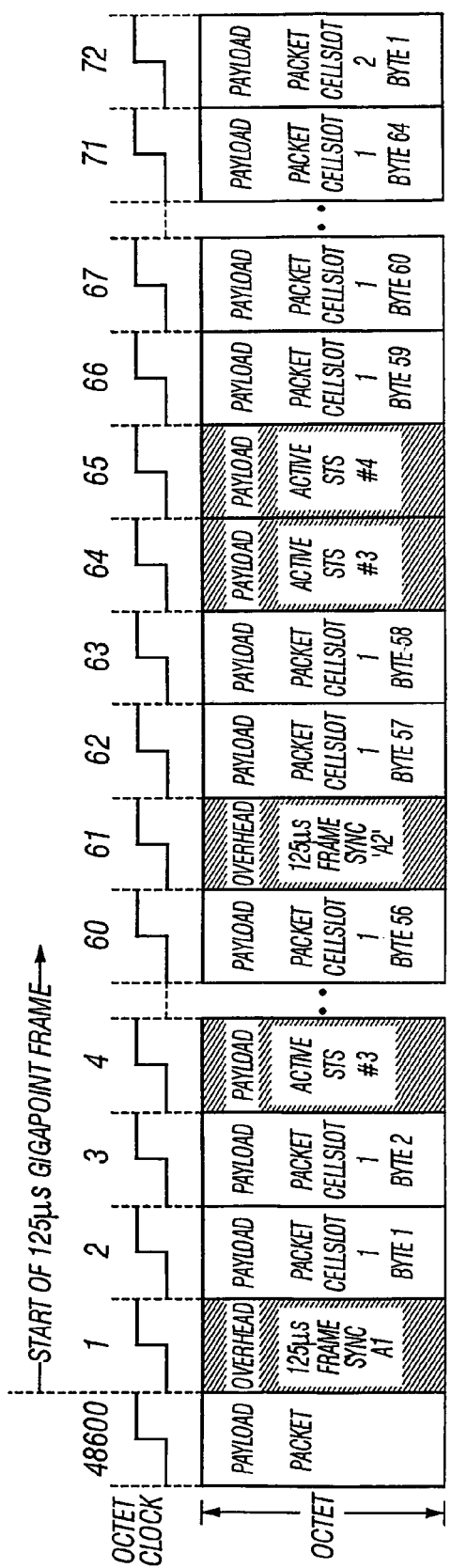
FIG. 20 illustrates an example of varying packet slot width

Packet slots each carry one 64-byte GigaPoint packet. Synchronous GigaPoint packets may carry TDM or multicast traffic in sync GigaPoint channels. Asynchronous packet slots carry unicast traffic in async GP channels, or unused sync GigaPoint channels. After frame sync, the next sync packet timeslot not used by overhead or STS traffic is the first timeslot of the first packet slot. Subsequent packet slots are mapped over the next available timeslots. The number of active STS channels, active sync channels and the packet slot's position relative to GigaPoint overhead timeslot causes the packet slot duration on GigaPoint bus 100 to vary. Both transmit and receive GigaPoint MACs must maintain sync and async packet slot counters that are gated by overhead and STS timeslots. An example of varying packet slot width is illustrated in FIG. 20 below.

The line units include, without limitation, POTS and/or DS1 line units. POTS DS0 traffic and synchronous DS1 (Digital Signal Level 1-1.544 Mbps traffic stream, typically used to carry 24 DS0 s as well as their signaling information) traffic are transported in sync TDM packets. POTS line units may be installed in all line unit slots. Each POTS line unit may have up to twenty-four (24) voice lines. Each DS1 (Digital Signal Level 1-1.544 Mbps data format)line unit has 12 DS1 lines. Each DS1 line carries up to 24 DS0 voice lines for a total of 288 voice lines per card.

As seen in FIG. 1B, each line unit LU1-LUn processes incoming voice traffic VT and data traffic DT before sending the traffic on to RC 105. DS1, POTS and Combo Card line units include incoming VT. If the VT is in analog form, the traffic must be first sampled and then converted into data by a coder/decoder (CODEC) 120 as the voice traffic is an analog signal coming in. A CODEC performs analog-digital and digital-analog conversion for DS0 channels. CODEC 120 samples the voice traffic at a DS0 rate of one byte per frame. CODEC 120 then generates numbers, based upon the sampling, which are converted into packets. The conversion into packets is performed by AP 110 for POTS which gathers samples until AP 110 has gathered 24 samples, or 24 bytes of information, to form a synchronous TDM packet or multiple sparsely populated synchronous TDM packets.

Based on software control, these digital DS0 samples bytes are populated into one or more synchronous TDM packets. Each synchronous TDM packet may transport from one to twenty-four DS0 samples. A 4-bit signaling nibble is inserted in the packet for each DS0 sample byte. A new DS0 sample is generated during each 125 microsecond frame. After the voice traffic VT has been digitized and converted into packets, the packets are sent to an appropriate destination by AP 110. For DS1, this AP 110 contains the pre-programmed information, discussed above, regarding correlation of outgoing ports with the intended destination of the traffic. Based on the origin of the traffic and the intended destination of the traffic, RC 105 uses the pre-programmed instructions to determine which outgoing port on the line unit LU the packet must be sent through.

Data traffic DT is sent directly to AP 110 as data traffic DT is already in digital format. However, data traffic headers (typically ATM) must be translated to the data transfer system format (i.e., the GigaPoint header seen in FIGS. 3C & 3D). Every-path through RC 105 will be identified by an internal Routing Map/Flow ID. Headers are adapted upon ingress to the internal Routing Map and on egress back to a standard header format. RC 105 is designed to pass either fixed length cells (e.g., ATM cells) or variable length packets (e.g., IP) with minimal adaptation. IP entering the system over Point-to-Point Protocol need not be converted in order to transfer through RC 105.

Adaptation is only required if ATM/IP inter-working is required. As stated above, the outside header is adapted to the internal format in the line unit. In some cases, the ATM header is converted (i.e., adding an 11-bytes header and recalculating the HEC) in AP 110. In other cases, the ATM header is converted in the external packet processor. For POTS, AP 110 provides the 16-byte header.

For DSL, the ATM header from the DSL PHY is prepended with 11-bytes by AP 110. DS1 cards packets are generated at the Edge Packet Processor. These packets may be up to 61-bytes in length. AP 110 inserts the remaining header bytes to generate a 64-byte packet. At SONET line units, the PHY generates ATM headers. These headers are extended at both the Network Packet Processor and AP 110.

AP 110 sends both the digitized voice traffic VT and data traffic DT to a Serializer/Deserializer (SerDes) 125. SerDes 125 converts the traffic from parallel into serial and from serial into parallel. As stated above, POTS line cards can be 24 ports, DS1 line cards can be 12 ports (12×24) and Combo cards can be 12 ports. If the VT is analog, each port (i.e., line) requires one CODEC function. This may be one CODEC function per chip, dual, or quad.

Figure 22:
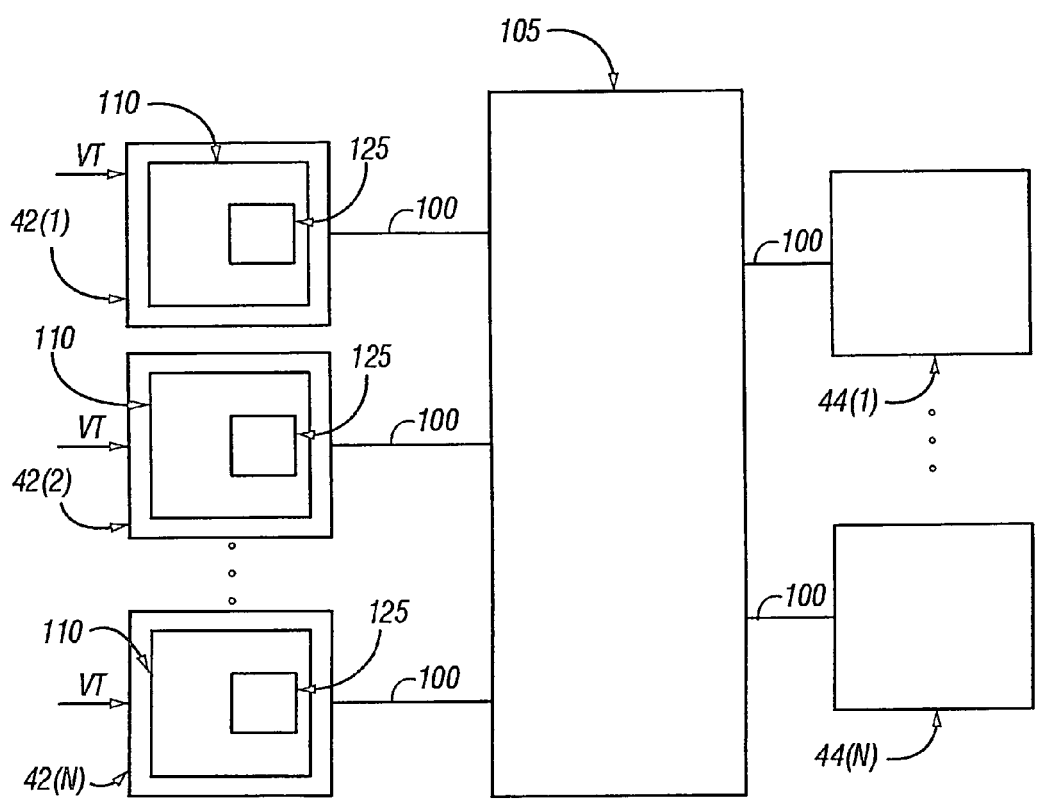
FIG. 22 illustrates line units and the routing crossconnect on a C7 shelf

FIG. 22 illustrates line units 42(1)-42(N) (where 1≦N≦N+1), target line units(where 1≦N≦N+1), and RC 105 on a C7 shelf. SerDes 125 is located inside AP 110. An AP 110 is located inside each line unit 42(1)-42(N), 44(1)-44(N). AP 110 may receive TDM packets from an Edge Packet Processor (DS1), or a serial stream of DS0 samples from AP 110 converts the packets (POTS and Combo). As stated above, traffic going into the line units are formed into TDM packets in AP 110 and are then sent to RC 105 where traffic may be merged and then routed to a target line unit 44(1)-44 (N). There is a SerDes 125 located within AP 110 and also a SerDes 125 for each GigaPoint in RC 105.

At RC 105, TDM packets meeting certain criteria may be merged and routed to a target line unit while other TDM packets are merely routed to a target line unit without being merged. AP 110 interfaces between RC 105 on RAP 115 and Line Units 42(1)-42(N). AP 110 performs the following functions: receive and transmit TDM and packet based traffic; transmit local queue status; receive control and arbitration information; interface up to twenty-four physical interfaces on a Line Unit; interface to an external packet processor; map POTS CODEC traffic into the system internal packet format; classification of traffic streams into 16 classes of service (CoS); and slice packets into FLPs.

A RISC processor in AP 110 receives the serial stream (DS0s and signaling) from the CODECs and converts the serial stream to sync TDM packet payload. The TDM packet FPF and other routing information is provisioned by software for each TDM packet.

DS0 sources are any line units that provide an interface to analog, T1 (Transport carrier level 1-1.544 Mbps transmission signal) or SONET (Synchronous Optical Network) multiplexed voice channels. With a greater number of DS0 channels, the minimum required data transport rate increases. Possible sources of DS0 traffic are: 24 ports POTs line unit; POTS/DSL (12 ports POTs and 12 ports DSL); 12 port DS1 or T1 trunk; DS3; and SONET line units.

Each source line unit must encapsulate its DS0 channels into TDM cells (FIGS. 3A-3C) for transport. POTS line units encapsulate DS0 s at the AP 110. The AP 110 is capable of generating a single sync TDM packet carrying twenty-four DS0 channels (with expansion capacity for thirty DS0s). Higher bandwidth DS0 source line units, such as DS1 line units, encapsulate DS0 s at an Edge Packet Processor. The Edge Packet Processor receives DS0 traffic from the DS1 framers over individual T1/E1 buses. After encapsulation, the packet processor drives the TDM packets with a packet type of TDM strictly scheduled. At the egress path, the process occurs in the reverse order. A Timeslot Interchanger (TSI) function in AP 110 sparsely populates in expanded format. The TSI reads the FPF and positions the TDM packets in that packet slot within the 125 microsecond frame.

Each source line unit (LU1-LUn) must encapsulate its DS0 channels into TDM packets (FIGS. 3A-3D) for transport. POTS line units encapsulate DS0 s at AP 110. AP 110 is capable of generating multiple TDM packets carrying twenty-four DS0 channels (with expansion capacity for thirty DS0s). Higher bandwidth DS0 source line units, such as DS1 line units, encapsulate DS0s at a Edge Packet Processor. The Edge Packet Processor receives DS0 traffic from the DS1 framers over individual T1/E1 buses. After encapsulation, the Edge Packet Processor drives the TDM packets to AP 110 as ATM cells. At the egress path, the process occurs in the reverse order. AP 110 expands the packet processor TDM packets to up to 512 synchronous TDM packets. A Time Slot Interchange (TSI) function in AP 110 sparsely populates up to 512 TDM packets in expanded format. The expansion consists of selecting any DS0 channel in any of the TDM packets received from the Edge Packet Processor and mapping it to any DS0 channel in any of the 512 TDM packets to be sent by AP 110 towards RC 105.

Figure 23A:
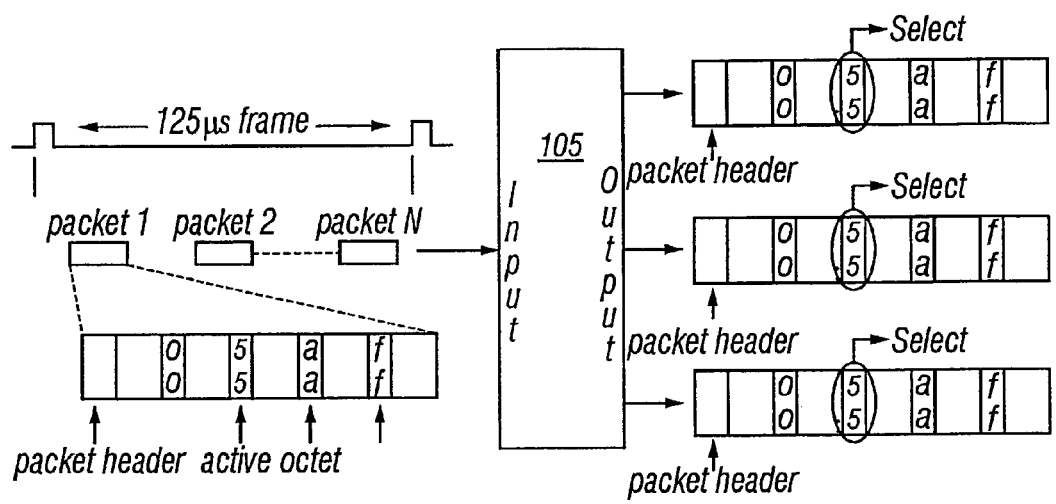
FIG. 23A illustrates the routing crossconnect transporting TDM packets via a "scatter process".
Figure 23B:
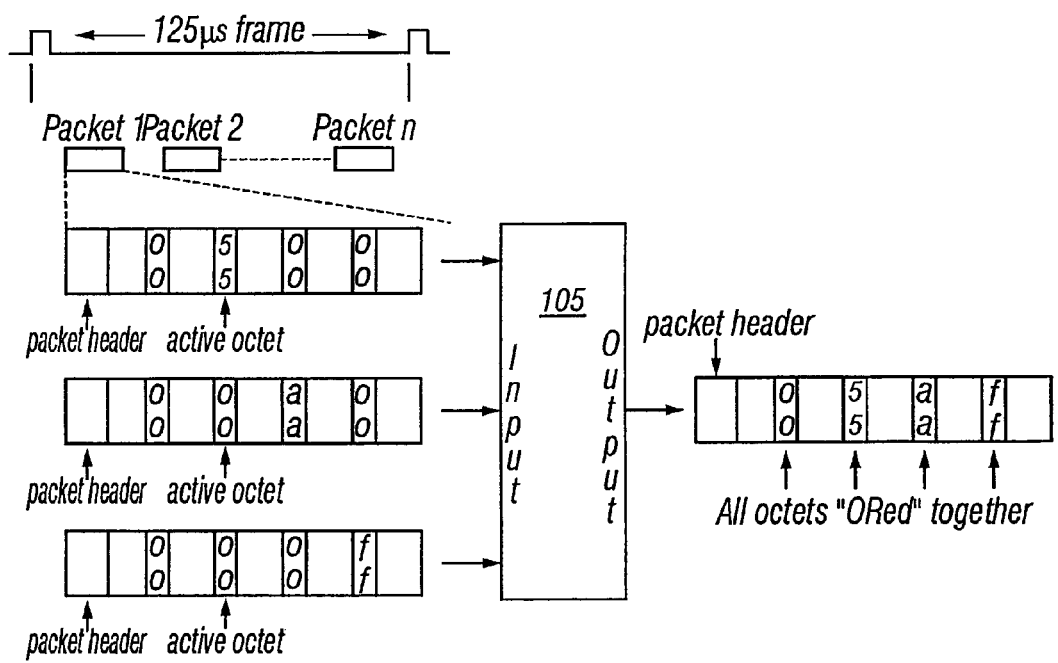
FIG. 23B illustrates the routing crossconnect transporting TDM packets via a "gather process".

As seen in FIGS. 23A and 23B, RC 105 transports TDM (e.g., POTS and DS1-GR303) via a "scatter process" (FIG. 23A) and a "gather process" (FIG. 23B). In this embodiment, TDM packets are merged at DS1 or POTS shelves. The scatter process is the process of distributing TDM traffic away from RC 105. There are "N" number of packets sent per every 125 microsecond frame (where 1≦N≦N+1). FIG. 23A illustrates a TDM packet entering RC 105 with three DS0 data channels containing actual voice traffic (i.e., active octet). The 24-bit Routing Map embedded in the TDM packet header has multiple bits set.

Each bit corresponds to an outgoing port on RC 105 that the packet must be forwarded to. As the packet enters RC 105, the packet is replicated and sent to all destinations. The gather process is the process of collecting and merging TDM packets inside RC 105 and sending the merged TDM packet to a destination. FIG. 23B illustrates multiple packets entering RC 105 on different input ports. Each packet carries voice traffic in an exclusive position shown as the active octet. The packets also occupy the same position within the 125 microsecond frame. The Frame Position Field of all packets are identical and correspond to the position of the packet within the frame. The 24-bit Routing Map field embedded in the TDM packet header is programmed such that all packets are going to the same output port on RC 105. As packets enter RC 105, all packets are merged to form a single packet that is then sent out on the output port.

For the scatter and gather process to function, TDM data must be mapped in two dimensions in participating line units. TDM data must be mapped into 1 of 24 possible B-channels within a selected TDM packet (FIG. 3C). Signaling associated with the data is mapped into 1 of 24 possible nibbles within a selected TDM packet (FIG. 3C). The formatted packet is then scheduled once per every 125 microseconds frame. Each unique TDM packet must be scheduled accurately within the 125 microsecond frame to allow discrimination of the involved scatter/gather logic. TDM packets are created and terminated within AP 110 on the POTS line unit and in both AP 110 and the packet processor on the DS1/T1 line unit.

Unused positions must be nulled to zero on a static configuration basis. Active DS0 channels (up to 24) must be transferred to/from the CODEC port every 125 microsecond frame.

Towards AP 110, the Edge Packet Processor on the DS1 line unit maps the DS1 (T1) channels to selected positions anywhere in a scheduled sequence of up to 28 packets per 125 microsecond frame. If the Edge Packet Processor formatting function alone is inadequate, AP 110 may provide an expansion and nulling function. AP 110 may expand up to 512 packets from the 28 packets emitted from the Edge Packet Processor per frame. The nulling function can set any position in the 512 packets to zero. These functions facilitate packet merging within RC 105.

When merging is not required, packets containing DS0 information may be routed as asynchronous traffic in AP 110 and RC 105. Packets carrying DS0 traffic have highest priority. There are multiple queues in AP 110 to support multiple classes of service (CoS).

One embodiment uses a line rate of 3.1104 GBPS for supporting the six millisecond super frame, and this rate is 20 percent greater than 2.488 GBPS line rate which is the standard line rate of an OC 48 SONET line rate. The 20 percent excess capacity is used for control channel information for packet traffic. The 20 percent is selected because the SERDES technology is designed for 3.11 GBPS with an 8-10 encoding, which gives the 20 percent excess capacity when the 10 bits are mapped into 8 bits. This embodiment turns the encoder off and uses the excess capacity for carrying packet control traffic.

As noted above, one embodiment of a line card transmits a number of bytes in each frame as overhead bits, and one of the overhead bytes include a single bit signal that indicates an upcoming removal of the line card. On receiving such a signal, the switching card automatically filters out any further signals that are supplied by the line card.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as falling within the true spirit and scope of this invention.

We claim:

1. A method of creating a signal comprising a message for transmission from a line unit to a switch unit in a network element of a communication network, the method comprising:
   arranging in the message a plurality of contiguous bytes of traffic; and
   arranging in the message a plurality of contiguous nibbles of signaling;
   wherein there is one nibble of signaling for each byte of traffic; and
   wherein the nibbles of signaling are different from one another, and the nibbles are equal in number to the bytes.

2. The method of claim 1 wherein the message is 64-bytes in length.

3. The method of claim 1 wherein the nibbles of signaling comprise at least 12 bytes.

4. The method of claim 1 wherein the nibbles of signaling comprises at least 15 bytes.

5. A method of creating a signal comprising a message for transmission from a line unit to a switch unit in a network element of a communication network, the method comprising:
   arranging in the message a plurality of contiguous bytes of traffic;
   arranging in the message a plurality of contiguous nibbles of signaling wherein there is one nibble of signaling for each byte of traffic; and
   including at least one control byte immediately following the plurality of contiguous nibbles of signaling.

6. The method of claim 5, further comprising:
   including in the message a header preceding the bytes of traffic.

7. The method of claim 6 wherein the header comprises a frame sequence number byte such that the frame sequence number byte identifies the position of the signal within a 6 millisecond superframe.

8. The method of claim 6, wherein the header comprises at least 16 bytes.

9. The method of claim 5 further comprising:
   including at least one pad byte immediately following the control byte.

10. The method of claim 5 wherein each byte of traffic is a B-channel.

11. The method of claim 9 wherein the bytes of B-channel traffic comprise at least 24 bytes.

12. The method of claim 9 wherein the nibbles of signaling immediately follow the B-channels.

13. A method of creating a signal comprising a message, the method comprising:
   arranging in said signal a plurality of contiguous B-channels, wherein each B-channel is a byte of a voice sample;
   placing in said signal a plurality of contiguous nibbles of signaling immediately following the B-channels wherein there is one nibble of signaling for each B-channel;
   wherein the nibbles of signaling are different from one another and the nibbles are equal in number to the bytes;
   wherein a header precedes the B-channels; and
   wherein the message is 64-bytes.

14. The method of claim 13 wherein the message further comprises:
   at least one frame sequence field such that the frame sequence field identifies a position of the signal within a 6 millisecond superframe and wherein the frame sequence field is located between the header and the B-channels; and
   at least one control byte immediately following the plurality of contiguous nibbles of signaling.

15. A process for creating a payload of a message, the process comprising:
   arranging a plurality of contiguous B-channels, wherein each B-channel is a byte of a voice sample;
   placing a plurality of contiguous nibbles of signaling immediately following the B-channels;
   wherein the nibbles of signaling are different from one another and the nibbles are equal in number to the bytes
   preceding the B-channels with a header; and
   locating at least one byte containing a frame sequence field between the header and the B-channels.

16. The process of claim 15 wherein: the frame sequence field is located to identify a position of a signal within a 6 millisecond superframe.

17. The process of claim 16 further comprising: including at least one control byte immediately following the signaling.

18. The process of claim 16 further comprising:
   using a 6 bit frame count that changes monotonically in the frame sequence field to determine if all frames are received.

19. The method of claim 6, further comprising:
   including in the message a header preceding the bytes of traffic.

20. The method of claim 19 wherein the header comprises a frame sequence number byte that identifies a position of the signal within a superframe.

21. The method of claim 19, wherein the header comprises at least 16 bytes.

22. The method of claim 16 wherein the message is 64-bytes in length.

23. The method of claim 16 wherein the nibbles of signaling comprise at least 12 bytes.

* * * * *

UNITED STATES PATENT AND TRADEMARK OFFICE
CERTIFICATE OF CORRECTION

PATENT NO. : 7,551,650 B2
APPLICATION NO. : 11/404236
DATED : June 23, 2009
INVENTOR(S) : Jason Dove Page 1 of 1

It is certified that error appears in the above-identified patent and that said Letters Patent is hereby corrected as shown below:

Column 25
Line 36, "the position" should be changed to --a position--.
Line 45, "claim 9" should be changed to --claim 10--.
Line 47, "claim 9" should be changed to --claim 10--.

Column 26
Line 38, "claim 6," should be changed to --claim 5,--.

Signed and Sealed this

Fifteenth Day of September, 2009

David J. Kappos
*Director of the United States Patent and Trademark Office*